(12) United States Patent
Ishida et al.

(10) Patent No.: US 8,394,183 B2
(45) Date of Patent: Mar. 12, 2013

(54) ASYMMETRIC MEMBRANE AND AIR-CONDITIONING SYSTEM USING THE SAME

(75) Inventors: Junya Ishida, Saitama (JP); Mitsuaki Negishi, Saitama (JP); Yuzo Morioka, Saitama (JP); Mika Kawakita, Obu (JP); Katsunori Iwase, Kariya (JP); Manabu Maeda, Nagoya (JP); Masahiko Minemura, Annaka (JP); Mamoru Hagiwara, Annaka (JP)

(73) Assignees: Shin-Etsu Polymer Co., Ltd., Tokyo (JP); Denso Corporation, Aichi (JP); Shin-Etsu Chemical Co., Ltd., Tokyo (JP)

( * ) Notice: Subject to any disclaimer, the term of this patent is extended or adjusted under 35 U.S.C. 154(b) by 268 days.

(21) Appl. No.: 12/740,144

(22) PCT Filed: Oct. 27, 2008

(86) PCT No.: PCT/JP2008/069460
§ 371 (c)(1),
(2), (4) Date: Jun. 29, 2010

(87) PCT Pub. No.: WO2009/057557
PCT Pub. Date: May 7, 2009

(65) Prior Publication Data
US 2010/0294132 A1    Nov. 25, 2010

(30) Foreign Application Priority Data

Oct. 29, 2007  (JP) .................... 2007-280839
Oct. 17, 2008  (JP) .................... 2008-268743

(51) Int. Cl.
*B01D 53/22*    (2006.01)
(52) U.S. Cl. ............... 96/12; 95/47; 95/51; 95/54; 96/7; 96/11
(58) Field of Classification Search ............... 95/47, 51, 95/54; 96/7, 11, 12
See application file for complete search history.

(56) References Cited

U.S. PATENT DOCUMENTS

| | | | | |
|---|---|---|---|---|
| 4,822,382 A | * | 4/1989 | Nelson | 95/54 |
| 5,919,583 A | * | 7/1999 | Grot et al. | 429/494 |
| 6,316,684 B1 | * | 11/2001 | Pinnau et al. | 585/818 |
| 6,461,702 B2 | * | 10/2002 | Gong | 428/36.6 |

(Continued)

FOREIGN PATENT DOCUMENTS

| | | |
|---|---|---|
| JP | 60-132605 A | 7/1985 |
| JP | 2-222715 A | 9/1990 |

(Continued)

OTHER PUBLICATIONS

Translation of Yoshinark et al. (JP 02222715 A) Sep. 5, 1990.*

(Continued)

*Primary Examiner* — Jason M Greene
*Assistant Examiner* — Anthony Shumate
(74) *Attorney, Agent, or Firm* — Osha Liang LLP

(57) ABSTRACT

An asymmetric membrane contains a porous layer and a dense layer adjacent thereto. The porous layer and the dense layer are formed of a polymeric material. The porous layer and/or dense layer contains a filler. The amount of the filler is 11 parts by mass or more per 100 parts by mass of the polymeric material contained in the asymmetric membrane.

6 Claims, 27 Drawing Sheets

U.S. PATENT DOCUMENTS

| | | | |
|---|---|---|---|
| 6,649,559 B2 * | 11/2003 | Drost et al. | 502/182 |
| 7,264,650 B2 * | 9/2007 | Lou et al. | 95/54 |
| 7,669,719 B2 * | 3/2010 | Ramaswamy et al. | 210/490 |
| 2002/0056369 A1 * | 5/2002 | Koros et al. | 95/51 |
| 2002/0056371 A1 * | 5/2002 | Hayes | 96/11 |
| 2003/0183080 A1 * | 10/2003 | Mundschau | 95/55 |
| 2010/0132559 A1 * | 6/2010 | Ishida et al. | 96/5 |
| 2010/0326121 A1 * | 12/2010 | Ishida et al. | 62/407 |

FOREIGN PATENT DOCUMENTS

| | | |
|---|---|---|
| JP | 5-7749 A | 1/1993 |
| JP | 5-184891 A | 7/1993 |
| JP | 6-188167 A | 7/1994 |
| JP | 6-210146 A | 8/1994 |
| JP | 8-208989 A | 8/1996 |
| JP | 9-285723 A | 11/1997 |
| JP | 11-009976 A | 1/1999 |
| JP | 11-192420 A | 7/1999 |
| JP | 2002-535115 A | 10/2002 |
| JP | 2002-332305 A | 11/2002 |
| JP | 2004-203367 A | 7/2004 |

OTHER PUBLICATIONS

Machine translation of Masayoshi et al. JP 06-210146 Aug. 2, 1994.*
Machine translation of Akira et al. JP 11-009976 Jan. 19, 1999.*
Machine translation of Akira et al. JP 11-192420 Jul. 21, 1999.*
Translation of International Preliminary Report on Patentability issued in International Application No. PCT/JP2008/069460, mailed on Jun. 10, 2010, with Transmittal (11 pages).

International Search Report from PCT/JP2008/069460 dated Dec. 9, 2008 (2 pages).
espacenet abstract Publication No. JP11192420A dated Jul. 21, 1999 (1 page).
espacenet abstract Publication No. JP11009976A dated Jan. 19, 1999 (1 page).
espacenet abstract Publication No. JP2222715A dated Sep. 5, 1990 (1 page).
espacenet abstract Publication No. JP60132605A dated Jul. 15, 1985 (1 page).
espacenet abstract Publication No. JP2004203367A dated Jul. 22, 2004 (1 page).
espacenet abstract Publication No. JP5007749A dated Jan. 19, 1993 (1 page).
espacenet abstract Publication No. JP6188167A dated Jul. 8, 1994 (1 page).
espacenet abstract Publication No. 5184891A dated Jul. 27, 1993 (1 page).
espacenet abstract Publication No. 2002535115 dated Oct. 22, 2002 (1 page).
espacenet abstract Publication No. 9285723A dated Nov. 4, 1997 (1 page).
espacenet abstract Publication No. Jp8208989A dated Aug. 13, 1996 (1 page).
espacenet abstract Publication No. 2002332305A dated Nov. 22, 2002 (1 page).

* cited by examiner (a) AIR FLOW WHEN DOOR IS CLOSED (b)

(a)

(b)

(a)

(b)

OUTSIDE-AIR FLOW (c)

(d)

(a)

(b)

(a)

(b)

(a)

(b)

(a)

(b)

ASYMMETRIC MEMBRANE AND AIR-CONDITIONING SYSTEM USING THE SAME

TECHNICAL FIELD

The present invention relates to an asymmetric membrane and an air-conditioning system using the asymmetric membrane.

BACKGROUND ART

Asymmetric membranes formed of various polymeric materials have been conventionally known. Examples of such asymmetric membranes include membranes using fluorine-containing polyimides as coating materials (e.g., JP 05-7749 A and JP 06-188167 A), a membrane using a polyacrylonitrile (e.g., JP 05-184891 A), a membrane using a polyolefin (e.g., JP 2002-535115 A), a membrane using a polyethersulfone (e.g., JP 09-285723 A), and membranes using poly(1-trimethylsilyl-1-propyne) (PTMSP) (e.g., JP60-1323605 A and JP 02-222715 A). All of these membranes are intended for gas separation or liquid-liquid separation; they do not contain a filler, nor do they provide sufficient gas permeability.

Membranes prepared by sol-gel reactions intended for liquid-liquid separation are known as separation membranes containing fillers (e.g., JP 11-192420 A and JP 11-9976 A). These membranes, however, are not also suitable as membranes intended for gas permeation.

The recent technological advances have made it possible to increase air-tightness even in spaces such as automobiles, where increasing the air-tightness has been difficult. When many passengers are aboard an automobile with such high air-tightness for long hours, a decrease in oxygen concentration or an increase in carbon dioxide concentration will occur, which may cause the passengers a headache or an unpleasant feel. Thus, the introduction of an adequate amount of outside air is necessary.

However, urban roads, highways, and the like are contaminated with pollutants such as dust; therefore, direct introduction of outside air into automobiles has been a big problem in view of the passengers' health. One example of a method for solving this problem is a method in which an inlet for introducing outside air is provided with a filter for removing pollutants in the air such as suspended matter.

Non-woven cloths, mechanical filters, and the like have been conventionally used as such filters. In JP 2004-203367 A, an air-conditioning system for the entire automobile is suggested.

However, conventional filters such as non-woven cloths and mechanical filters had a problem in that they cannot sufficiently remove suspended matter in the air having particle sizes of 10 μm or less (hereinafter referred to as "SPM"). Among SPM, particularly nanoparticles having particle sizes on the order of 10 nanometers, when inhaled into a human body, are considered to reach the lower respiratory tract such as the bronchium and alveo, and be easily deposited. Thus, there is a strong desire for the development of an air-conditioning system that can sufficiently block these nanoparticles.

The use of a gas-permselective membrane made of a polymeric material as a filter enables removal of SPM to some extent; in this case, however, the gas permeability is insufficient, and the object of introducing sufficient outside air cannot be achieved.

SUMMARY OF THE INVENTION

The present invention was made in view of the above-described circumstances. An object of the present invention is to provide a membrane that can remove suspended matter in the air such as SPM, and has sufficient gas permeability; and an air-conditioning system using the membrane.

In one aspect, the present invention relates to an asymmetric membrane comprising a porous layer and a dense layer adjacent thereto, the porous layer and the dense layer being formed of a polymeric material. In the asymmetric membrane of the present invention, the porous layer and/or the dense layer contains a filler.

Because the asymmetric membrane of the present invention has the above-described specific structure that employs the porous layer and/or the dense layer containing a filler, it can sufficiently remove suspended matter in the air such as SPM, and has sufficient gas permeability.

Preferably, the polymeric material is a polymer having at least one Si atom. The amount of the filler is preferably 11 parts by mass or more per 100 parts by mass of the polymeric material contained in the asymmetric membrane. With these features, particularly significant effects of the present invention can be attained.

Preferably, the ratio between an oxygen permeability coefficient $P(O_2)$ and a nitrogen permeability coefficient $P(N_2)$ at $23\pm2°$ C. and under a pressure difference of 1.05 to 1.20 atm through the membrane satisfies Formula (1) given below. With this feature, even more significant effects of the present invention can be attained.

$$0.85 < P(O_2)/P(N_2) < 1 \quad (1)$$

Preferably, the ratio between the oxygen permeability coefficient $P(O_2)$ and a carbon dioxide permeability coefficient $P(CO_2)$ at $23\pm2°$ C. and under no pressure difference through the membrane satisfies Formula (3) given below. With this feature, even more significant effects of the present invention can be attained.

$$0.719 < P(O_2)/P(CO_2) < 1.70 \quad (3)$$

In the asymmetric membrane of the present invention, the porous layer and/or the dense layer may comprise a mesh. Since the asymmetric membrane has a mesh, the mechanical strength of the membrane can be improved, preventing breakage of the membrane due to an external stress.

In another aspect, the present invention relates to an air-conditioning system. The air-conditioning system of the present invention comprises the above-described asymmetric membrane of the present invention as a membrane that supplies a gas to a space to be air-conditioned and/or discharges the gas from the space to be air-conditioned.

EFFECT OF THE INVENTION

According to the present invention, a membrane that can remove suspended matter in the air such as SPM, and has sufficient gas permeability; and an air-conditioning system using the membrane are provided.

REFERENCE SIGNS LIST

3: porous layer, 5: dense layer, 10: vehicle, 11: cabin wall, 12: reinforcing material, 12a: forward reinforcing material, 12b: rear reinforcing material, 13, 13a, 13b: asymmetric membrane (permeable membrane), 14: dust filter, 15: heat-storage material, 16: moisture-proof material, 17: deodorant material, 19: cabin, 18: oxygen sensor, 21: polymer layer, 22: exterior wall, 23: filler, 24: interior wall, 25: void, 26: outside-air inlet, 27a: forward opening/closing door, 27b, 27d: hinge, 27c: rear opening/closing door, 27e: forward weir, 27f: rear weir, 28: outside-air outlet, 29a: forward fan, 29b: rear fan, 30: air-conditioning unit, 32: damper, 32a: hinge, 35: air-conditioning unit case, 35a: outside-air inlet, 35b: inside-air inlet, 35c: opening, 36: filter, 37: blower fan, 38: case, 40, 40a, 40b: permeable member, 42a, 42b: support, 50: front pillar, 50a: exterior wall, 52: central pillar, 52a: outside-air inlet, 52b: outside-air outlet, 52c: inside-air inlet, 52d: inside-air outlet, 52e: upper end, 52f: lower end, 54: rear pillar, 55: hollow member, 56a, 56b: fan, 60: temperature sensor, 70: hollow, 80: windowpane, 90: controller, 110: pressure-regulating ventilator, 112: cover, 118: blower, 122: body, 126: outside-air inlet, 127a: forward weir, 127b: rear weir, 128: outside-air outlet, 130: windshield, 132, 132a, 132b: porous glass, 134: reinforcing material, 138: sunroof, 140: door, 150: floor portion, 152: floor plate, 152a: inside-air inlet, 152b: inside-air outlet, 153a: side plate, 154: outer panel, 154c: outside-air inlet, 154d: outside-air outlet, 156a, 156b: fan, 164: interior material.

DETAILED DESCRIPTION

Preferred embodiments of the present invention are described in detail below; however, the invention is not limited to the following embodiments.

Asymmetric Membrane

Figure 1:
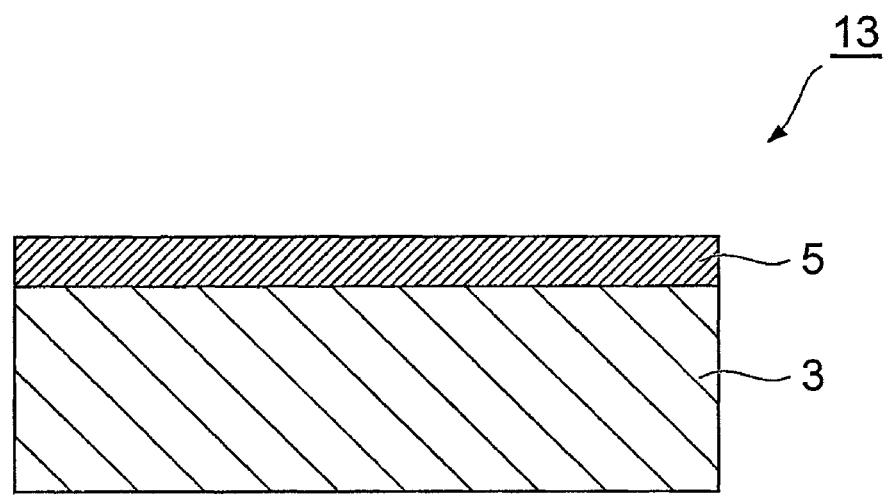
FIG. 1 is a cross-sectional view showing one embodiment of the asymmetric membrane.

FIG. 1 is a cross-sectional view showing one embodiment of the asymmetric membrane. The asymmetric membrane 13 shown in FIG. 1 includes a porous layer 3 and a dense layer 5 adjacent to the porous layer 3. The dense layer 5 is a layer that may be generally referred to as the "skin layer" in this technical field. The porous layer 3 and dense layer 5 are integrally formed of the same polymeric material. A filler is dispersed in the porous layer 3. The asymmetric membrane 13 contains as major components the filler and the polymeric material that forms an asymmetric structure having the porous layer 3 and dense layer 5, but may further contain other components. The asymmetric membrane 13 preferably has a thickness of 0.1 to 10 mm.

The dense layer 5 has the function of selectively permeating gases such as nitrogen and carbon while preventing the permeation of SPM. For this purpose, the dense layer 5 may have a density such that it can sufficiently prevent the permeation of SPM. The dense layer 5, however, may contain pores having a pore volume smaller than that of the porous layer 3.

The dense layer 5 may contain the same filler as that of the porous layer 3. In this case, it is highly likely that pores are formed around the filler. It is believed that, when pores are formed in the dense layer 5 by the inclusion of the filler, Knudsen flow is predominant in the dense layer 5, and consequently, the gas permeability of the dense layer 5 is remarkably improved. A detailed consideration of this effect will be given later.

In order to ensure sufficient gas permeability, the thickness of the dense layer 5 is preferably 1 mm or less. The thickness of the dense layer 5 is preferably 0.005 mm or more, and more preferably 0.01 mm or more.

The porous layer 3 is composed of the polymeric material and filler, and functions as a support for the dense layer 5 while maintaining a high degree of gas permeability. If the dense layer 5 is used alone, reducing the thickness of the dense layer 5 for ensuring sufficient gas permeability may result in insufficient strength and the like in the entire membrane. However, because the porous layer 3 functions as a support for supporting the dense layer 5, sufficient mechanical strength and ease of handling are maintained in the asymmetric membrane 13 as a whole. From this standpoint and the like, the thickness of the porous layer 3 is preferably 1 to 500 mm.

The polymeric material that forms the asymmetric membrane 13 may be any polymer that can form the dense layer and porous layer. Specifically, the polymeric material is preferably a polymer having a Si atom (hereinafter sometimes referred to as the "Si-based polymer"). The Si-based polymer may have at least one Si atom, and has, for example, a polyorganosiloxane backbone and/or a triorganosilyl group represented by Formula (10):

$$—SiR_3 \qquad (10)$$

Preferably each R is independently a $C_1$-$C_{30}$ alkyl, aryl, aralkyl, or alkenyl group, or any of these groups substituted with a halogen atom. An example of a Si-based polymer having a triorganosilyl group is poly(1-trimethylsilyl-1-propyne).

The polyorganosiloxane backbone is a structure in which silicon atoms and oxygen atoms are alternately bonded, and an organic group is bonded to at least a portion of the silicon atoms. The organic group bonded to the silicon atoms in the polyorganosiloxane backbone is preferably a $C_1$-$C_{30}$ alkyl group that may be substituted with a halogen atom, a $C_1$-$C_{30}$ aryl group that may be substituted with a halogen atom, a $C_1$-$C_{30}$ aralkyl group that may be substituted with a halogen atom, or a $C_1$-$C_{30}$ alkenyl group that may be substituted with a halogen atom.

Examples of Si-based polymers having a polyorganosiloxane backbone include polyorganosiloxanes; and silicone-modified polymers obtained by introducing a polyorganosiloxane backbone into the molecular chain of an organic polymer not having a polyorganosiloxane backbone by way of block copolymerization or graft polymerization. Examples of silicone-modified polymers include silicone-modified cycloolefin polymers, silicone-modified pullulan polymers (for example, those described in JP 08-208989 A), and silicone-modified polyimide polymers (for example, those described in JP 2002-332305 A).

An example of a silicone-modified cycloolefin polymer is a polymer represented by Chemical Formula (12) given below, obtained by metathesis polymerization of an organic silicon compound represented by Chemical Formula (11) given below. Metathesis polymerization is performed according to a routine method, in which a monomer is dissolved in an aromatic hydrocarbon solvent such as toluene or xylene, and polymerization is performed with stirring in a nitrogen atmosphere at 40 to 60° C. and atmospheric pressure in the presence of a polymerization catalyst. Usable as polymerization catalysts are tungsten-, molybdenum- and ruthenium-based complexes referred to as "carbene complexes"; preferably, Grubbs First Generation Catalyst, Grubbs Second Generation Catalyst, or Hoveyda-Grubbs Catalyst is used. The amount of the polymerization catalyst to be added varies depending on the molecular weight of the polymer designed, and the degree of polymerization can be controlled by the molar ratio between the starting material monomer and polymerization catalyst. Specifically, the polymerization catalyst may be added in a concentration of 1 to 1,000 ppm, and preferably 50 to 500 ppm, based on the monomer. An amount of the polymerization catalyst to be added less than 50 ppm lacks practicality in that the rate of polymerization will be low, resulting in a low yield. Conversely, an amount exceeding 500 ppm is economically undesired.

[Chemical Formula 1]

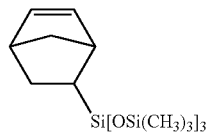

Si[OSi(CH$_3$)$_3$]$_3$

[Chemical Formula 2]

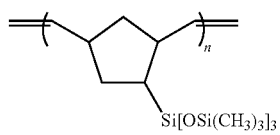

Si[OSi(CH$_3$)$_3$]$_3$

The polymer shown above may be a polymer in which at least a portion of the carbon-carbon double bonds of the main chain has been hydrogenated. The hydrogenation improves the thermal stability of the polymer. The hydrogenation ratio can be determined by, for example, comparing the peak intensity after hydrogenation with the peak intensity derived from the carbon-carbon double bonds of the main chain in the $^1$H-NMR spectrum of the polycycloolefin before hydrogenation. Preferably 50 to 100%, more preferably 80% or more, and most preferably 90% or more of the carbon-carbon double bonds of the main chain is hydrogenated.

The polymer preferably has a number average molecular weight (Mn) of 100,000 to 5,000,000, and more preferably 300,000 to 3,000,000. If Mn is less than 100,000, the viscosity will be low, and therefore the solution will become unstable during the preparation of the asymmetric membrane, often making it difficult to obtain a membrane with a uniform surface. Conversely, if Mn exceeds 5,000,000, the synthesis will be difficult, making it difficult to practically obtain a membrane. The number average molecular weight is herein measured by gel permeation chromatography (hereinafter "GPC") using toluene as an eluant, and is converted using the calibration curve of a standard polystyrene.

The polymeric material that forms the asymmetric membrane 13 may be polyacetylene, cellulose acetate, cellulose triacetate, cellulose nitrate, cellulose, polyacrylonitrile, polyamide, polysulfone, polyethersulfone, polycarbonate, polyester, polyimide, polyethylene, polypropylene, polytetrafluoroethylene, polyvinylidene fluoride, polyvinyl chloride, cycloolefin polymer, phenol resin, poly(meth)acrylate resin, polyvinylidene chloride, polyvinyl acetal, polyurethane, melamine resin, epoxy resin or polyvinyl alcohol. These polymeric materials can be used alone or in combination.

An organic filler or an inorganic filler can be used as the filler. The filler surface may be hydrophilic or hydrophobic, but an inorganic filler having a hydrophilic surface is particularly preferable. Examples of such inorganic fillers include oxide fillers made of oxides such as silica, zeolite, alumina, titanium oxide, magnesium oxide and zinc oxide. Among the above, a silica filler is preferred. Examples of silica fillers include spherical silica, porous silica particles, quartz powder, glass powder, glass beads, talc, and silica nanotubes.

To particularly enhance the gas permeability, the filler is preferably a porous filler. Preferable as porous filers are mesoporous silica particles, nanoporous silica particles, and zeolite particles. The mesoporous silica particles are porous silica particles having pores and a particle size of 500 to 1,000 nm, and the nanoporous silica particles are porous silica particles having pores and a particle size of 30 to 100 nm. In general, the mesoporous silica particles have a pore size of 3 to 7 nm, and the nanoporous silica particles have a pore size of 2 to 5 nm. The use of a filler having a low apparent density, such as a porous filler, is considered to greatly enhance the performance of the asymmetric membrane.

As required, a filler that has undergone a surface treatment using a coupling agent or the like, or a filler that has been hydrophilized by a hydration treatment may be used.

The filler content is typically 5 to 500 parts by mass per 100 parts by mass of the polymeric material contained in the asymmetric membrane 13. The filler content is preferably 11 parts by mass or more, more preferably 30 parts by mass or more, and particularly preferably 70 to 400 parts by mass. If the filler content is less than 5 parts by mass, the effect of enhancing the gas permeability tends to be small. Conversely, if the filler content exceeds 500 parts by mass, the mechanical strength of the asymmetric membrane tends to decrease, making it difficult to reduce the thickness of the membrane.

To achieve the object of the present invention at a particularly high level, the asymmetric membrane 13 is preferably a membrane whose permeation rate of a gas depends on the molecular weight of the gas. In other words, it is preferred that Knudsen flow is predominant in the flows of gases within the asymmetric membrane 13. The "Knudsen flow" means the flow of a gas so thin that the molecular movement becomes problematic (see Kagaku Daijiten 3 ("Dictionary of Chemistry, Vol. 3"), edited by Kagaku Daijiten Henshu Iinkai ("Edition Committee of Dictionary of Chemistry"); reduced-size edition, p. 44). When Knudsen flow is predominant, the permeation rate of a gas depends on the molecular weight of the gas.

In a membrane through which a gas permeates by ideal Knudsen flow, the permeability coefficient P of a gas is inversely proportional to the square root of the molecular weight of the gas. For example, when the gas components permeated are oxygen and nitrogen, the separation ratio α between them is 0.935, as expressed by Formula (2) given below. In Formula (2), $P(O_2)$ and $P(N_2)$ represent the permeability coefficients of oxygen and nitrogen, respectively; and $M(O_2)$ and $M(N_2)$ represent the molecular weights of oxygen and nitrogen, respectively.

[Mathematical expression 1]

$$\alpha = \frac{P(O_2)}{P(N_2)} = \frac{\sqrt{M(N_2)}}{\sqrt{M(O_2)}} = 0.935 \quad (2)$$

There is also a gas flow referred to as "solution-diffusion flow". The solution-diffusion flow is a flow that depends on the product of the solubility of a gas in the membrane and the diffusion coefficient of the gas in the membrane. The permeation rate of a gas in the membrane by the solution-diffusion flow is generally slower than that by Knudsen flow. In conventional polymeric membranes, the solution-diffusion flow is often predominant in the flows of gases permeating through the membranes. It is known that, in membranes in which the solution-diffusion flow is predominant, the separation ratio α between oxygen and nitrogen is 1 or more.

Further, there is a gas flow referred to as "Poiseuille flow". Poiseuille flow is a flow that depends on the viscosity of a gas. It is known that, in membranes in which Poiseuille flow is predominant, the separation ratio α between oxygen and nitrogen is 0.85 or less.

As described above, it is possible to evaluate the condition of the flow of a gas permeating through a membrane based on the value of the separation ratio α. Although mixtures of the various types of flow are considered to be occurring in actual membranes, Knudsen flow can be assumed to be predominant when the separation ratio α ($=P(O_2)/P(N_2)$) is within a range that satisfies Formula (1) given below. The oxygen permeability coefficient $P(O_2)$ and nitrogen permeability coefficient $P(N_2)$ are measured at 23±2° C. and under a pressure difference of 1.05 to 1.20 atm through the membrane.

$$0.85 < P(O_2)/P(N_2) < 1 \quad (1)$$

According to the finding of the present inventors, when the asymmetric membrane 13 has the above-described specific structure that comprises the porous layer and dense layer, and contains a filler, it is highly likely that the asymmetric membrane 13 satisfies Formula (1). Particularly when the filler is distributed not only in the porous layer 3 but also in the dense layer 5, an asymmetric membrane that satisfies Formula (1) can be easily obtained.

Although the reason that Knudsen flow occurs in the asymmetric membrane 13 is not necessarily clear, the present inventors believe the reason to be as explained below, with reference to the drawings.

Figure 2:
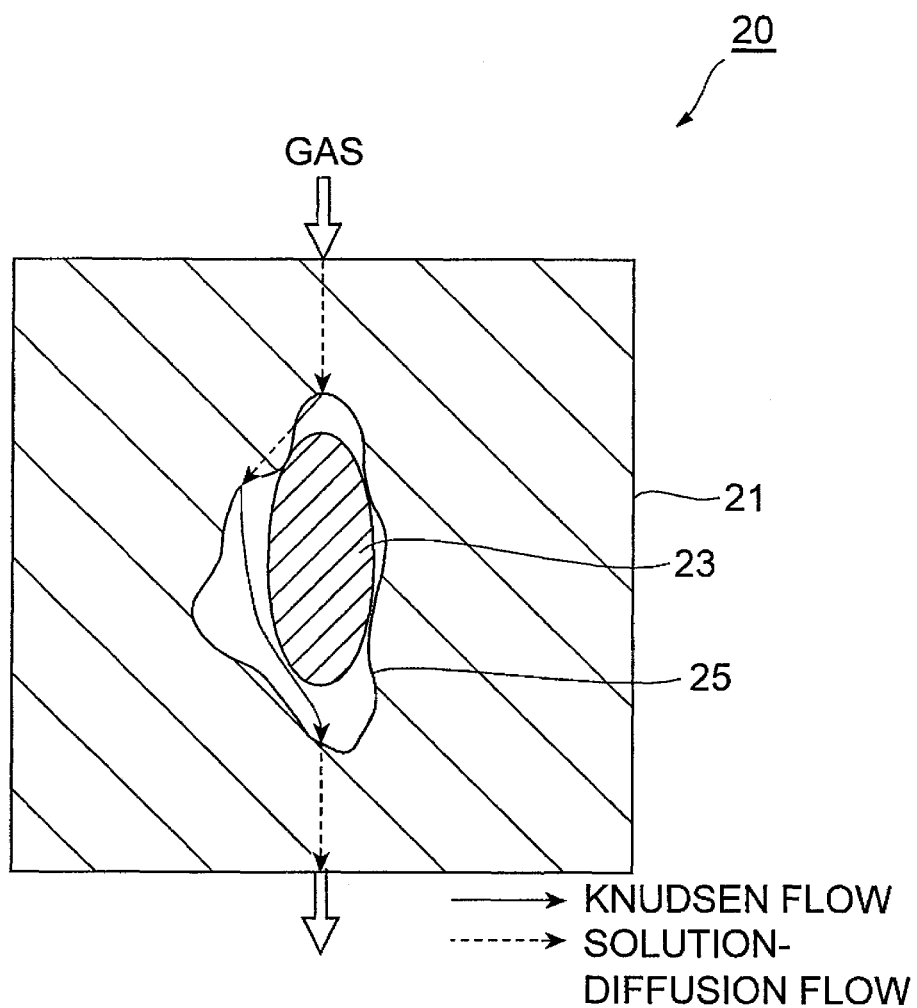
FIG. 2 is a schematic cross-sectional view showing an enlarged portion of the dense layer.
Figure 3:
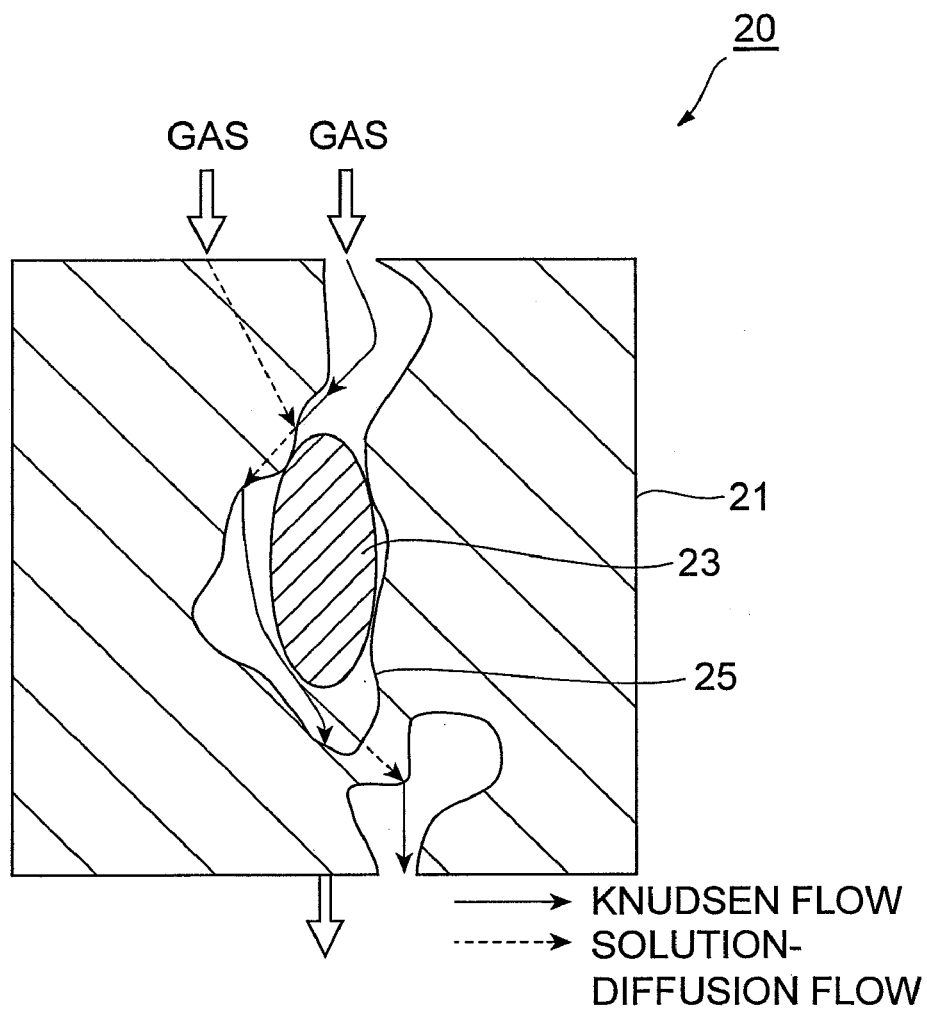
FIG. 3 is a schematic cross-sectional view showing an enlarged portion of the dense layer.

It is believed that gas permeability coefficients for the entire asymmetric membrane 13 depend on the permeability of the dense layer 5, and little affected by the porous layer 3; thus, the following consideration is given with reference to embodiments of the dense layer 5. FIGS. 2 and 3 are schematic cross-sectional views each showing an enlarged portion 20 of the dense layer 5.

In the portion 20 shown in FIG. 2, the dense layer 5 is composed of a polymer layer 21 formed of a polymeric material and a filler 23. At a boundary between the polymer layer 21 and filler 23 is formed a void 25 (for example, a void with a pore size of 1 to 100 nm) that produces Knudsen flow. It is believed that such void 25 is easily produced when the affinity between the polymer layer 21 and filler 23 is low.

In the portion shown in FIG. 2, a gas permeates through the polymer layer 21 by the solution-diffusion flow, and permeates through the void 25 by Knudsen flow. That is, the solution-diffusion flow and Knudsen flow are occurring in the portion of the dense layer 5 shown in FIG. 2. However, if the distance that the gas permeates by Knudsen flow is longer than the distance that the gas permeates by the solution-diffusion flow, it is presumed that Knudsen flow becomes predominant in the membrane as a whole, leading to dramatically improved gas permeability. Moreover, SPM is blocked at the portion where the gas permeates by the solution-diffusion flow, enabling the removal of suspended matter in the air such as SPM. When the dense layer 5 contains many portions having the embodiment shown in FIG. 2, the separation ratio α ($=P(O_2)/P(N_2)$) is considered to satisfy Formula (1a):

$$0.94 \leq P(O_2)/P(N_2) < 1 \quad (1a)$$

Likewise, in the portion 20 shown in FIG. 3, the dense layer 5 is composed of a polymer layer 21 formed of a polymeric material and a filler 23. A void 25 (for example, a void with a pore size of 100 to 1,000 nm) is formed at a boundary between the polymer layer 21 and filler 23. A plurality of fillers 23 may be present in the void 25.

In the portion of FIG. 3, it is presumed that a gas passes through the void 25 that induces Knudsen flow or Poiseuille flow, thereby dramatically improving the gas permeability.

Moreover, it is believed that, even when the void 25 has a relatively large pore size, as in the embodiment of FIG. 3, submicron or nanosize SPM is blocked. The reason for this is believed to be that, because SPM of submicron or less undergoes active Brownian motion of particles, it is difficult for such SPM to pass through a void with a pore size equal to or less than the distance of travel covered by the Brownian motion (the mean free path). When the dense layer 5 contains many portions having the embodiment shown in FIG. 3, the separation ratio α (=P(O$_2$)/P(N$_2$)) is considered to satisfy Formula (1b):

$$0.85 < P(O_2)/P(N_2) \leq 0.93 \tag{1b}$$

When the gas components permeated are oxygen and carbon dioxide, the separation ratio α between them is 1.17, as expressed by Formula (4) given below. In Formula (4), P(O$_2$) and P(CO$_2$) represent the permeability coefficients of oxygen and carbon dioxide, respectively; and M(O$_2$) and M(CO$_2$) represent the molecular weights of oxygen and carbon dioxide, respectively.

[Mathematical expression 2]

$$\alpha = \frac{P(O_2)}{P(CO_2)} = \frac{\sqrt{M(CO_2)}}{\sqrt{M(O_2)}} = 1.17 \tag{4}$$

Knudsen flow can be assumed to be predominant when the separation ratio α (=P(O$_2$)/P(CO$_2$)) is within a range that satisfies Formula (3) given below. The oxygen permeability coefficient P(O$_2$) and carbon dioxide permeability coefficient P(CO$_2$) are measured at 23±2° C. and under substantially no pressure (total pressure) difference through the membrane.

$$0.719 < P(O_2)/P(CO_2) < 1.70 \tag{3}$$

Moreover, when the dense layer 5 contains many portions having the embodiment shown in FIG. 2, the separation ratio α (=P(O$_2$)/P(CO$_2$)) is considered to satisfy Formula (3a):

$$1.17 \leq P(O_2)/P(CO_2) < 1.70 \tag{3a}$$

Furthermore, when the dense layer 5 contains many portions having the embodiment shown in FIG. 3, the separation ratio α (=P(O$_2$)/P(CO$_2$)) is considered to satisfy Formula (3b):

$$0.719 < P(O_2)/P(CO_2) \leq 1.17 \tag{3b}$$

The asymmetric membrane 13 can be produced by, for example, a method including the steps of applying to a substrate a mixture containing a polymeric material, a filler and a solvent for dissolving the polymeric material, to form a mixture layer; partially removing the solvent from the mixture layer to form a dense layer containing the polymeric material on a surface layer portion opposite the substrate of the mixture layer; and immersing the mixture layer having the dense layer in a poor solvent (a coagulating solvent) for the polymeric material, to form a porous layer containing the polymeric material and filler.

The solvent for dissolving the polymeric material is suitably selected according to the type and the like of the polymeric material used. For example, when the polymeric material is poly(1-trimethylsilyl-1-propyne) which is a Si-based polymer, it is preferable to use an aromatic hydrocarbon, an aliphatic hydrocarbon, a halogenated hydrocarbon, an ether or a ketone. Examples of aromatic hydrocarbons include benzene, toluene and xylene. Examples of aliphatic hydrocarbons include hexane, heptane, octane, decane and cyclohexane. Examples of halogenated hydrocarbons include chloroform, methylene chloride, and carbon tetrachloride. Examples of ethers include tetrahydrofuran and dioxane. Examples of ketones include ethyl methyl ketone.

When forming the dense layer, the conditions for removing the solvent (the drying method, temperature, time, etc.) are suitably adjusted so that a dense layer with a desired thickness is formed.

As a poor solvent (a coagulating solvent) used to form the porous layer, it is preferable to use an alcohol such as methanol, ethanol, or propanol; acetone; or water.

The asymmetric membrane of the present invention is not limited to the embodiments described above, and can be suitably modified without departing from the gist of the invention. For example, the asymmetric membrane may further have a mesh. That is, the porous layer and/or the dense layer may have a mesh. In this case, a mesh may be impregnated with a component that forms at least one of the porous layer and dense layer. A mesh may also be laminated on the porous layer or dense layer. An asymmetric membrane having a mesh can be prepared by, for example, impregnating a mesh with the above-mentioned mixture, or by applying the mixture to a mesh.

The use of a mesh can improve the mechanical strength of the membrane to prevent breakage of the membrane due to an external stress. While the mesh may be made of a metal or a resin, a mesh made of a resin is particularly preferable. Examples of resins that form the mesh include polyester terephthalate (PET) and polypropylene (PP). Examples of methods for weaving the mesh include plain weave, twill weave, plain dutch weave and twill dutch weave.

Further, the asymmetric membrane may be formed on a support, or may be a hollow fiber membrane.

Air-Conditioning System

The asymmetric membrane according to the above-described embodiments is suitably used as a permeable membrane in an air-conditioning method in which a gas is supplied to a space to be air-conditioned and/or the gas is discharged from the space to be air-conditioned via the permeable membrane. The air-conditioning system according to the present embodiment includes a membrane that supplies a gas to a space to be air-conditioned and/or discharges the gas from the space to be air-conditioned; and a partition wall that forms the space to be air-conditioned, while forming an opening in which the permeable membrane is provided. The partition wall is made of one or more members formed to block the permeation of gases. The asymmetric membrane according to the above-described embodiments is used as the permeable membrane.

The permeable membrane is installed at, for example, an inlet for introducing outside air. The space to be air-conditioned is a space that requires exchanging the gases inside the space with outside air. Specific examples of the space to be air-conditioned include interior spaces of vehicles (automobiles), houses, the Shinkansen (bullet trains) and aircraft.

Figure 4:
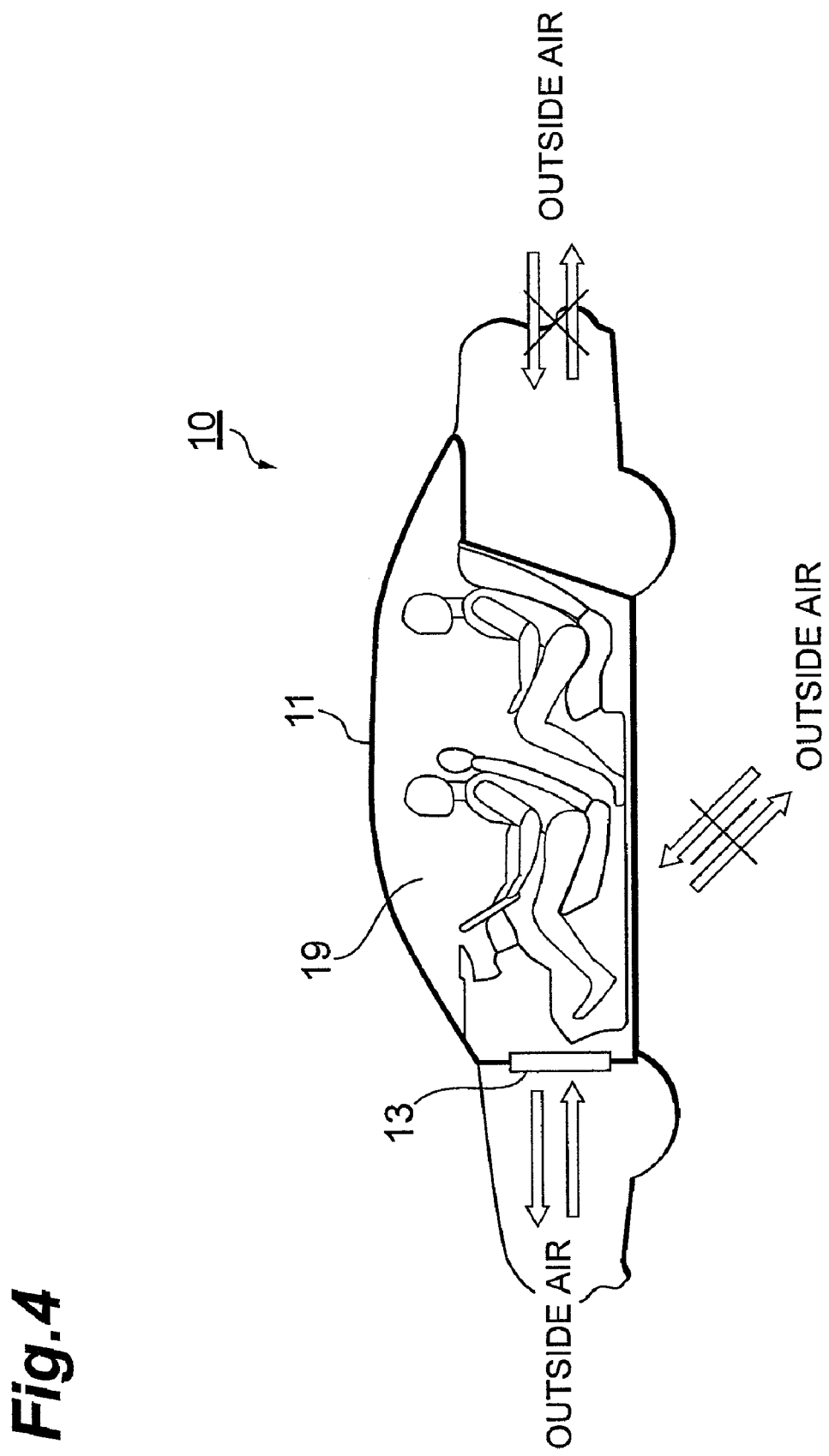
FIG. 4 is a schematic cross-sectional view showing one embodiment of a vehicle including an air-conditioning system.

FIG. 4 is a schematic cross-sectional view of one embodiment of a vehicle including an air-conditioning system cut along the forward-rearward direction. The vehicle (automobile) 10 shown in FIG. 4 includes an air-conditioning system having a cabin wall 11 serving as a partition wall that defines a cabin 19, and a permeable membrane 13 installed at an inlet for introducing outside air. The cabin 19 is a space to be air-conditioned that is substantially blocked from outside air except at the portion of the permeable membrane 13.

The cabin wall 11 is made of a material that is substantially gas-impermeable, such as iron, aluminum or a glass.

The permeable membrane that constitutes the air-conditioning system of the vehicle is installed as a part of, for example, an air-conditioning unit (FIG. 5), a pressure-regulating ventilator (FIG. 8), a ceiling (FIGS. 9, 10, and 11), a windshield (FIG. 12), a rear glass (FIG. 13), a sunroof (FIG. 14), a pillar (FIGS. 15 and 16), a floor (FIG. 17) or a door (FIGS. 18, 19, 20, 21, and 22). These embodiments are described below with reference to the drawings.

Figure 5:
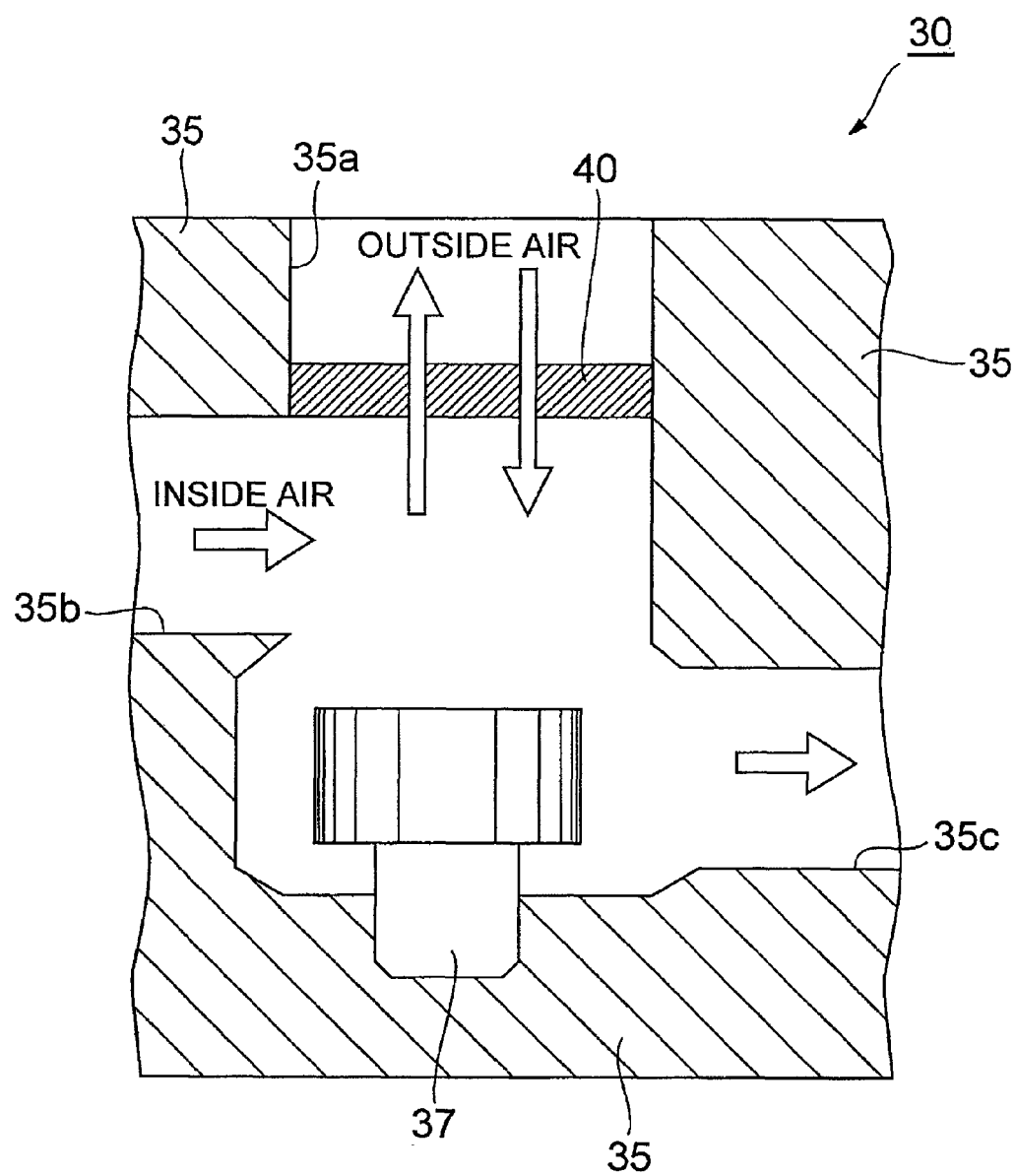
FIG. 5 is a schematic cross-sectional view showing one embodiment of an air-conditioning unit having a permeable membrane.

FIG. 5 is a schematic cross-sectional view showing one embodiment of an air-conditioning unit having a permeable membrane. The air-conditioning unit 30 shown in FIG. 5 includes an air-conditioning unit case 35, a centrifugal blower fan 37 and a permeable member 40. The air-conditioning unit case 35 is shaped to have an outside-air inlet 35a, an inside-air inlet 35b and an opening 35c formed. In the air-conditioning unit case 35, the blower fan 37 is installed on a path through which the inside air circulates. The permeable member 40 is installed to block the outside-air inlet 35a. The air-conditioning unit case 35 forms a part of the partition wall that defines the space to be air-conditioned.

In the air-conditioning unit 30, outside air is introduced into the air-conditioning unit from the outside-air inlet 35a via the permeable member 40, and inside air is introduced into the air-conditioning unit from the inside-air inlet 35b, while the outside air and/or inside air is supplied into the cabin 19 via the opening 35c. The inside air may be discharged out of the vehicle from the outside-air inlet 35a via the permeable member 40.

The air-conditioning unit case 35 is made of a resin having a certain degree of elasticity and excellent mechanical strength, such as polypropylene. A blower fan that is conventionally used to circulate the inside air in a vehicle can be used as the blower fan 37.

Figure 6:
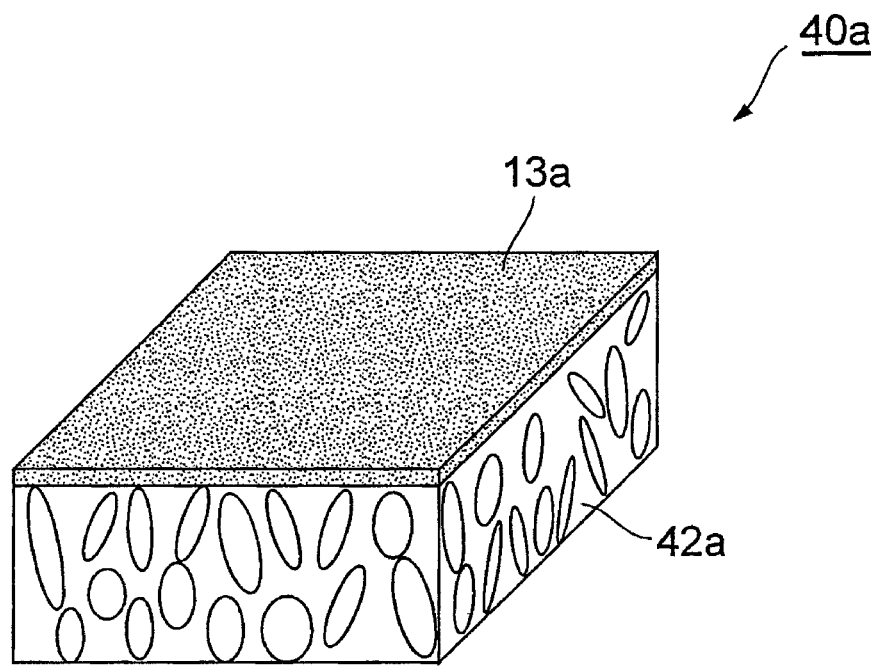
FIG. 6 is a perspective view showing one embodiment of a permeable member having a permeable membrane.
Figure 7:
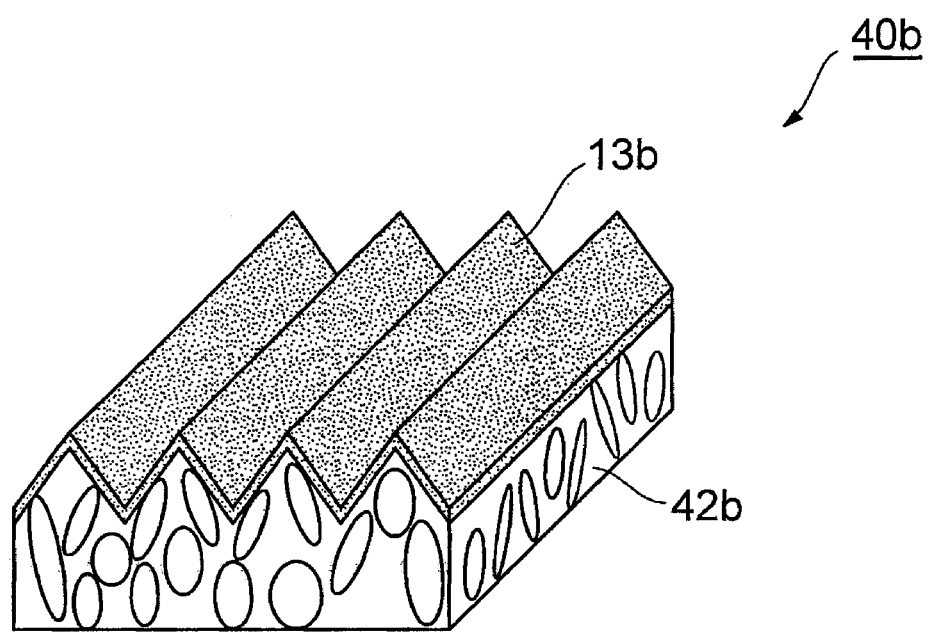
FIG. 7 is a perspective view showing one embodiment of a permeable member having a permeable membrane.

The permeable member 40 has a permeable membrane. Outside air can be introduced via this permeable membrane. FIGS. 6 and 7 are perspective views each showing one embodiment of a permeable member having a permeable membrane.

The permeable member 40a shown in FIG. 6 includes a plate-like support 42a and a permeable membrane 13a tightly attached to one surface of the support 42a. The permeable membrane 13a is supported by the support 42a. The support 42a may be tightly attached to only a portion of the permeable membrane 13a, for example, around the outer periphery of the permeable membrane 13a, or may be tightly attached to the permeable membrane 13a completely.

The permeable member 40b shown in FIG. 7 includes a plate-like support 42b and a permeable membrane 13b tightly attached to one surface of the support 42b. The surface of the support 42b at the side of the permeable membrane 13b forms an uneven pleated surface.

The permeable membranes 13a and 13b preferably have a thickness of 0.1 to 10 μm. The supports 42a and 42b may be made of any gas-permeable material; examples of such materials include fibrous members such as paper, as well as porous bodies having a pore size of 0.1 to 500 μm and meshes. The supports 42a and 42b preferably have a thickness of 50 to 500 μm.

Because the permeable membrane is supported by the support in each of the permeable members 40a and 40b, the thickness of the permeable membrane can be reduced to increase the amount of gases permeated, and the strength of the permeable membrane can be ensured. Moreover, because the permeable member 40b makes the surface area of the permeable membrane greater, the amount of gases permeated can be further increased.

Figure 8:
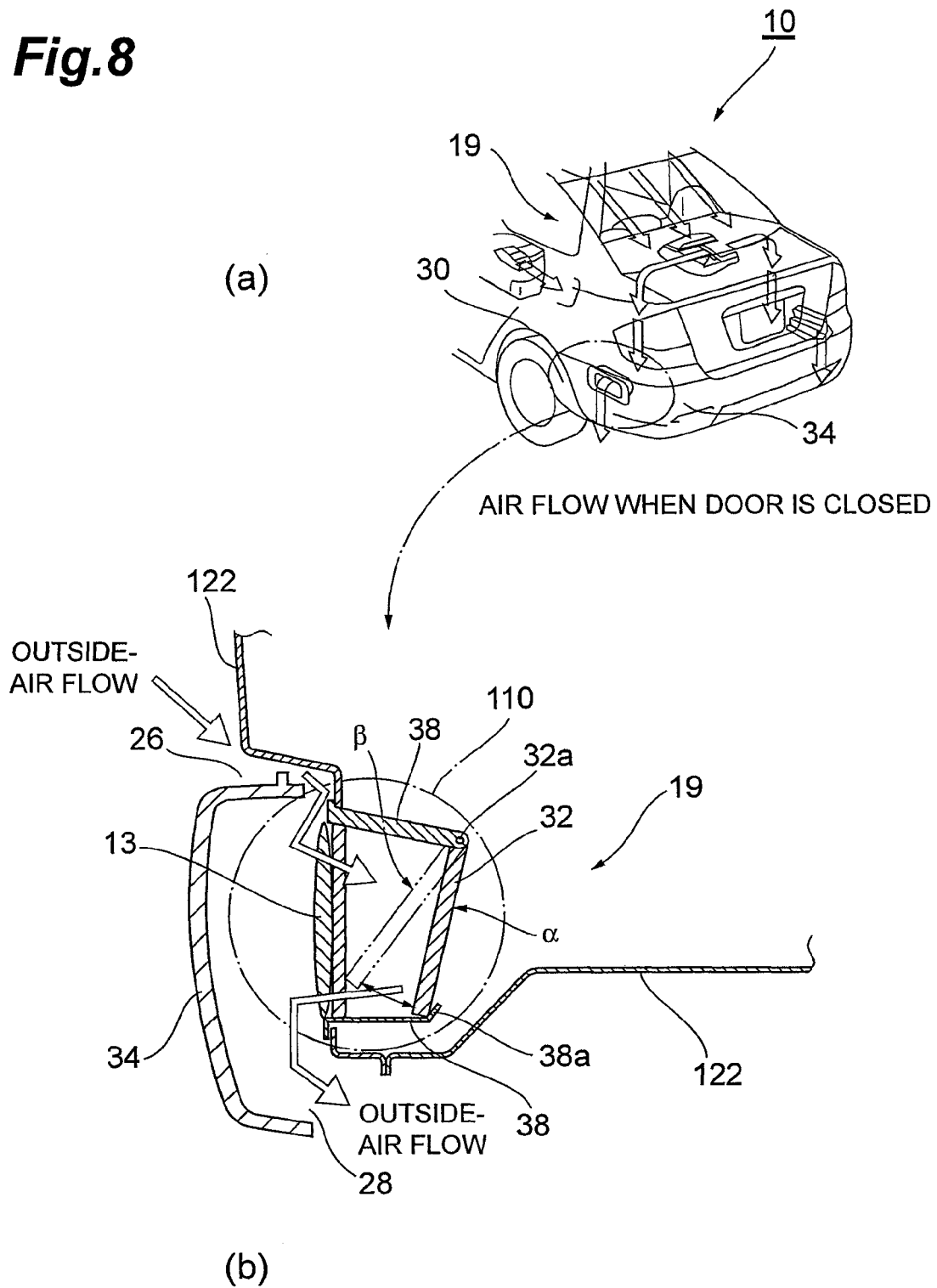
FIG. 8 is a schematic structural diagram showing one embodiment of a pressure-regulating ventilator having a permeable membrane.

FIG. 8 is a schematic structural diagram showing one embodiment of a pressure-regulating ventilator having a permeable membrane. FIG. 8(a) is a perspective view showing a rear portion of a vehicle 10; and FIG. 8(b) is a cross-sectional view of the rear portion of the vehicle 10 as seen from the rear of the vehicle 10. As shown in FIG. 8(a), the pressure-regulating ventilator 110 is disposed on each of right and left surfaces near a bumper 34 in the rear portion of the vehicle 10. As shown in FIG. 8(b), the pressure-regulating ventilator 110 includes a case 38, a damper 32 and a permeable membrane 13.

The pressure-regulating ventilator 110 is mounted so as to be embedded in a substantially rectangular opening formed in a portion of a body 122 of the vehicle 10.

The case 38 for the pressure-regulating ventilator 110 has the form of a rectangular tube, and is provided with a flange on an edge surface thereof facing outside the vehicle 10. This flange is secured to the body 122 by welding or the like.

The case 38 has an edge facing inside the body 122 (an interior edge) that is bent obliquely upward. This bent portion is referred to as a damper receiving portion 38a. An upper edge portion of the damper 32 is connected with an upper portion of the interior edge of the case 38 via a hinge 32a, and the damper 32 is rotatably mounted about the hinge 32a.

When a door of the vehicle 10 is closed, the pressure inside the cabin 19 increases, causing the damper 32 to be pushed to the outside of the vehicle 10 from the cabin 19. This causes the damper 32 to turn about the hinge 32a and be placed in an open position, i.e., the β position in FIG. 8(b).

When the damper 32 is in the open position, air flow when the door is closed occurs, as indicated by the arrows of FIG. 8(a), allowing the air inside the cabin 19 to be discharged out of the cabin 19. In this way, when the door is closed, the damper 32 is placed in the open position to alleviate the increase in pressure inside the cabin 19.

Once the pressure has been alleviated after the door is closed, the damper 32 turns about the hinge 32a toward the cabin 19 under its own weight, and rests with the lower end of the damper 32 brought into contact with the damper receiving portion 38a. Consequently, the damper 32 is placed in a closed position, i.e., the α position in FIG. 8(b), thus placing the cabin 19 in an enclosed state.

When a pressure is applied to the damper 32 from outside of the vehicle 10 toward the cabin 19, the damper 32 attempts to turn about the hinge 32a toward the cabin 19. At this time, the damper 32 also rests with its lower end brought into contact with the damper receiving portion 38a. Consequently, the damper 32 is placed in the closed position, thus placing the cabin 19 in an enclosed state.

Figure 9:
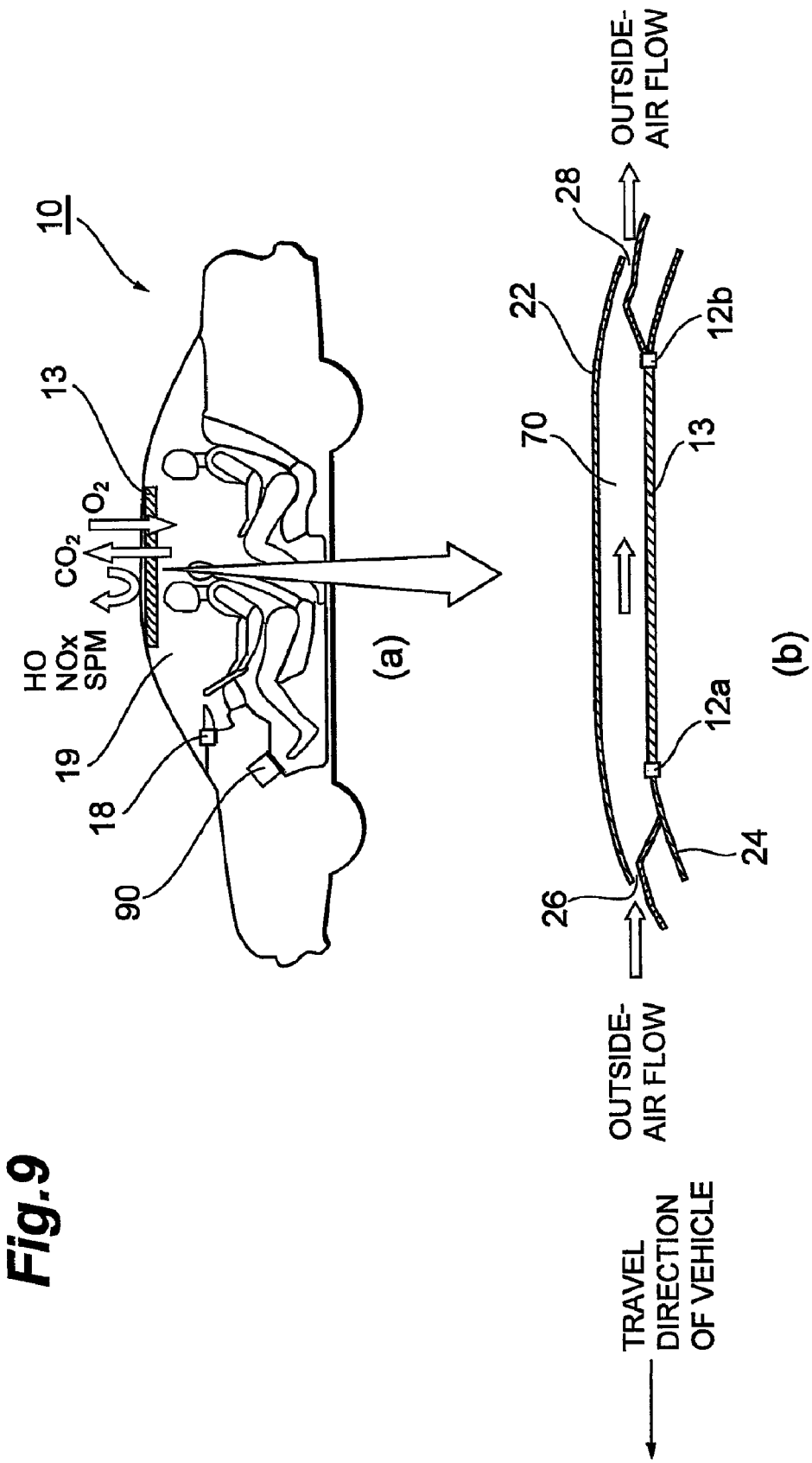
FIG. 9 is a schematic structural diagram showing one embodiment of a vehicle including a ceiling portion having a permeable membrane.
Figure 10:
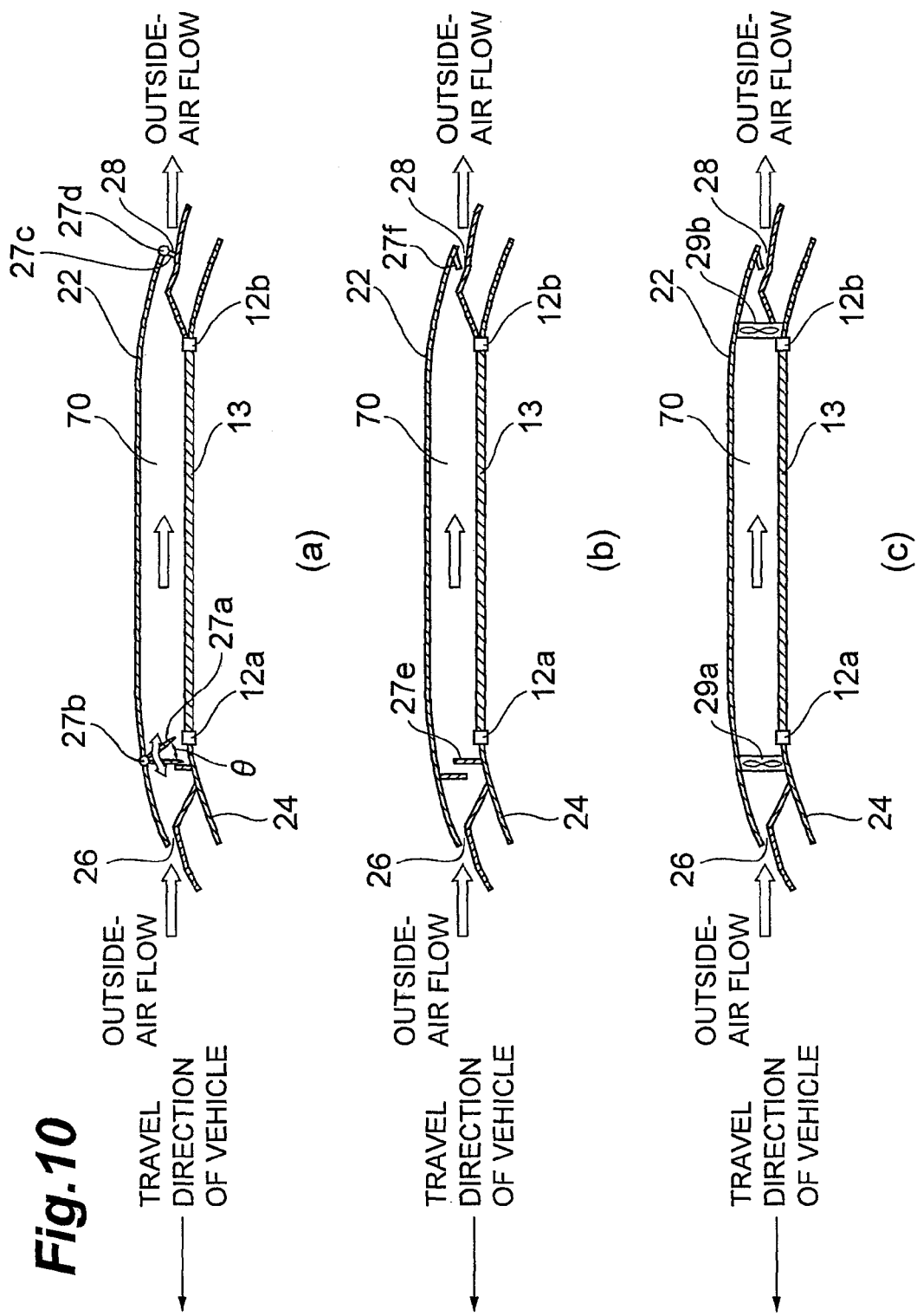
FIG. 10 is a schematic structural diagram showing one embodiment of a vehicle including a ceiling portion having a permeable membrane.
Figure 11:
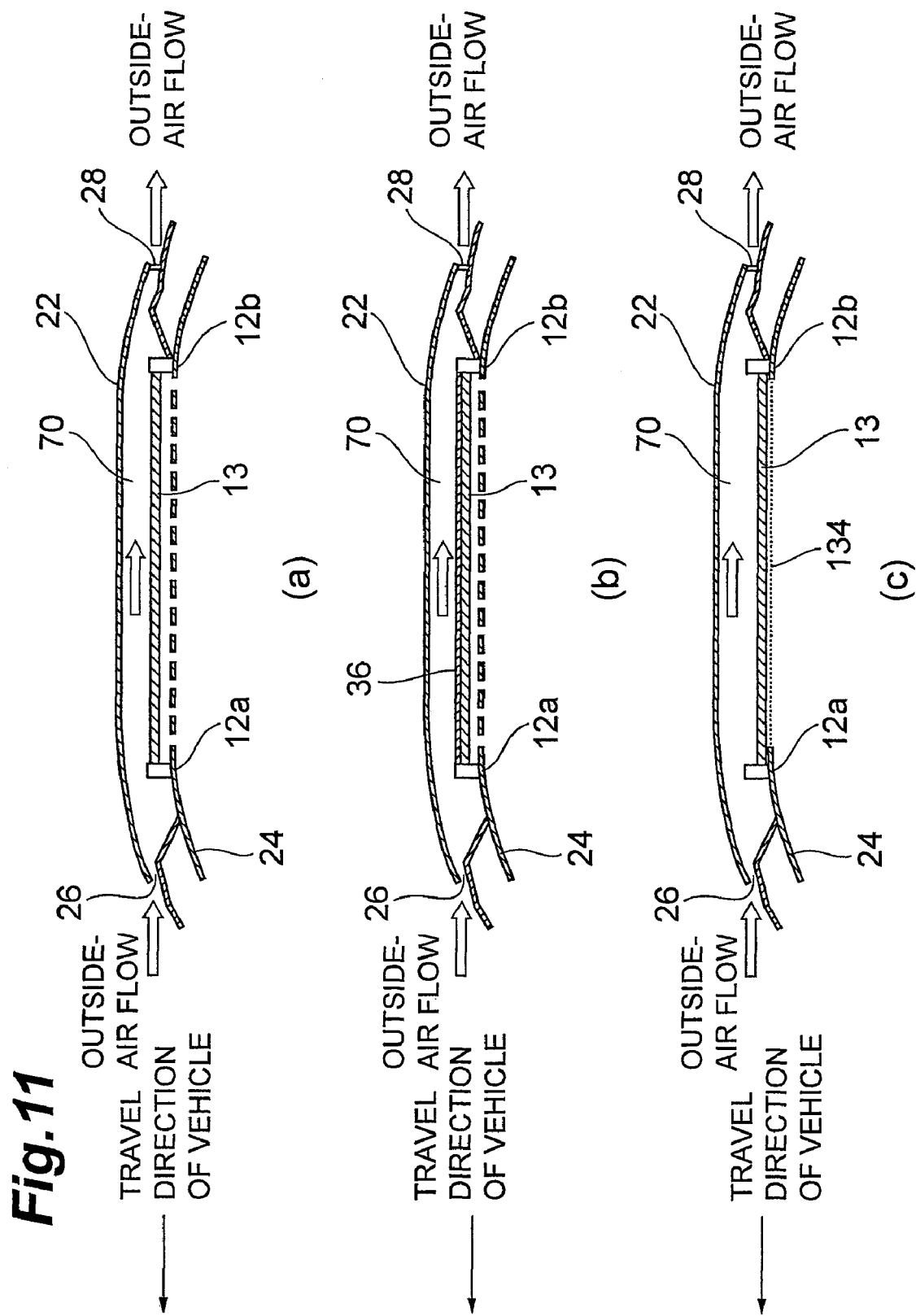
FIG. 11 is a schematic structural diagram showing one embodiment of a vehicle including a ceiling portion having a permeable membrane.

FIGS. 9, 10, and 11 are schematic structural diagrams each showing one embodiment of a vehicle including a ceiling portion having a permeable membrane. The vehicle 10 shown in FIG. 9(a) has a permeable membrane 13 provided to a ceiling portion. FIGS. 9(b), 10 and 11 are enlarged views showing embodiments of the ceiling portion of the vehicle 10.

As shown in FIG. 9(b), the ceiling portion of the vehicle 10 has an exterior wall 22 facing outside the vehicle 10 and an interior wall 24 facing a cabin 19, the exterior wall 22 and interior wall 24 being spaced apart from each other. The interior wall 24 forms a part of a partition wall that defines the cabin 19, which is the space to be air-conditioned. A permeable membrane 13 is installed to block an opening formed in the ceiling portion of the interior wall 24. A hollow 70 surrounded by the interior wall 24, permeable membrane 13 and exterior wall 22 is formed.

The exterior wall 22 and interior wall 24 are made of a material that is substantially gas-impermeable, such as iron, aluminum or a glass.

An outside-air inlet 26 is a hole defined by the exterior wall 22 to introduce outside air into the hollow 70 from the travel direction of the vehicle 10. An outside-air outlet 28 is a hole defined by the exterior wall 22 to discharge the outside air introduced into the hollow 70 to the direction opposite the travel direction of the vehicle 10. Each of the outside-air inlet 26 and outside-air outlet 28 is an elongated hole with a substantially square shape, whose longer dimension faces the lateral direction of the vehicle 10. The longer dimension and shorter dimension of the outside-air outlet 28 are determined based on the type of vehicle, or the amount of the outside air introduced into the hollow 70.

The permeable membrane 13 is disposed so that its surface facing the exterior wall 22 comes into contact with outside air introduced into the hollow 70 via the outside-air inlet 26, and its surface facing opposite the exterior wall 22 comes into contact with the air inside the cabin 19.

The permeable membrane 13 is mounted on the ceiling portion according to the following method: a portion of the interior wall 24 of the vehicle 10 is cut to form a substantially square opening; the permeable membrane 13 is inserted into the formed opening; and the periphery of the inserted permeable membrane 13 is reinforced with reinforcing materials. Of the reinforcing materials for reinforcing the periphery of the permeable membrane 13, the reinforcing material facing the travel direction of the vehicle 10 is called a forward reinforcing material 12a, and the reinforcing material facing opposite the travel direction of the vehicle 10 is called a rear reinforcing material 12b.

The shape of the opening in the ceiling portion of the interior wall 24, i.e., the shape of the permeable membrane 13, need not necessarily be substantially rectangular, and may also be any other shape that conforms to the shape of the ceiling, for example, circular, trapezoidal or a complicated shape formed by a plurality of straight lines and/or curves.

FIG. 10 is a schematic diagram showing a ceiling portion of a vehicle according to an embodiment that employs a means for preventing water drops from entering the hollow 70 from the outside-air inlet 26 and outside-air outlet 28, or an embodiment that employs a means for introducing outside air into the hollow 70 in response to the oxygen concentration in the cabin 19.

The embodiment shown in FIG. 10(a) includes a forward opening/closing door 27a and a rear opening/closing door 27c as means for preventing water drops from entering the hollow 70. The forward opening/closing door 27a is secured to the exterior wall 22 via a hinge 27b disposed in a position rearward of the outside-air inlet 26 and forward of the permeable membrane 13 in the travel direction of the vehicle 10. The rear opening/closing door 27c is secured to the exterior wall 22 via a hinge 27d disposed in a position forward of the outside-air outlet 28 and rearward of the permeable membrane 13 in the travel direction of the vehicle 10.

When subject to a pressure of the outside air, the forward opening/closing door 27a and rear opening/closing door 27c are opened or closed by turning about the hinges 27b, 27d, respectively. When the vehicle 10 runs, the outside air introduced via the outside-air inlet 26 impinges on the forward opening/closing door 27a. Thus, a pressure due to the outside air occurs on the surface of the forward opening/closing door 27a facing the outside-air inlet 26, causing the forward opening/closing door 27a to be opened by the pressure. Consequently, outside air is introduced into the hollow 70 via the outside-air inlet 26. When the vehicle 10 stops, outside air is not introduced via the outside-air inlet 26, and therefore, a pressure does not occur on the surface of the forward opening/closing door 27a facing the outside-air inlet 26, causing the forward opening/closing door 27a to be closed. The rear opening/closing door 27c is also opened or closed by the outside air introduced into the hollow 70, as with the forward opening/closing door 27a.

The maximum angle θ at which the forward opening/closing door 27a is opened is determined so that when the forward opening/closing door 27a is opened to a maximum degree, a lower end portion of the forward opening/closing door 27a is positioned forward of the permeable membrane 13 in the travel direction of the vehicle 10. In this way, even if the forward opening/closing door 27a is opened to the maximum angle θ due to the outside air impinging on the forward opening/closing door 27a, water drops potentially contained in the outside air that have impinged on the forward opening/closing door 27a and fallen down in the figure do not attach to the surface of the permeable membrane 13. Consequently, any reduction in the permeation performance of the permeable membrane 13 can be prevented.

The embodiment of FIG. 10(b) includes a plurality of weirs as means for preventing water drops from entering the hollow 70. Specifically, a forward weir 27e is disposed between the outside-air inlet 26 and permeable membrane 13, and a rear weir 27f is disposed between the permeable membrane 13 and outside-air outlet 28.

The forward weir 27e is composed of a pair of elongated plates with a substantially square shape, which are spaced apart in the travel direction of the vehicle 10. The pair of plates are mounted so that their longer dimensions face the width direction of the vehicle 10. The plate disposed closer to the outside-air inlet 26 is mounted on the surface of the exterior wall 22 facing inside the cabin so that a gap is formed between the plate and interior wall 24. The plate disposed closer to the permeable membrane 13 is mounted on the surface of the interior wall 24 facing outside the cabin so that a gap is formed between the plate and exterior wall 22. The length of the longer dimension of each plate is slightly greater than the length of the permeable membrane 13 in the width direction of the vehicle 10, in order to prevent water drops from entering the permeable membrane 13.

The rear weir 27f is composed of one plate. The rear weir 27f is mounted on an inside end of the exterior wall 22 that defines the outside-air outlet 28, so as to incline toward the travel direction of the vehicle 10. The length of the longer dimension of the rear weir 27f is also greater than the length of the permeable membrane 13 in the width direction of the vehicle 10.

Water drops potentially contained in the outside air that has been introduced into the hollow 70 are removed by the plate closer to the outside-air inlet 26 of the plates that form the forward weir 27e, fall down on an outside surface of the interior wall 24, and run along the outside surface of the interior wall 24 to be discharged out of the vehicle 10 via a drain. Remaining water drops that could not be removed by the plate closer to the outside-air inlet 26 are removed by the plate closer to the permeable membrane 13, and run along the outside surface of the interior wall 24 to be discharged out of the vehicle 10 via a drain. Consequently, entry of water drops from the outside-air inlet 26 into the hollow 70 can be sufficiently prevented.

Because outside air is discharged from the outside-air outlet 28, entry of water drops due to the flow of outside air into the outside-air outlet 28 is unlikely. However, water drops may enter the hollow 70 due to splashes of raindrops from an outer panel that forms the vehicle 10. To prevent this, the rear weir 27f is provided.

In this way, entry of water drops into the hollow 70 from the outside-air inlet 26 or outside-air outlet 28 is prevented, thereby preventing water drops from attaching to the surface of the permeable membrane 13 installed in the hollow 70. Since water drops do not attach to the surface of the permeable membrane 13, any reduction in the permeation performance of the permeable membrane 13 can be inhibited.

The embodiment shown in FIG. 10(c) includes a forward fan 29a, a rear fan 29b, an oxygen sensor 18, and a controller 90 as means for introducing outside air into the hollow 70, in response to the oxygen concentration in the cabin 19.

The forward fan 29a and rear fan 29b are used to enable adjustment of the amount of outside air to be introduced into the hollow 70 based on a command to introduce outside air. The forward fan 29a is installed in a position between the outside-air inlet 26 and permeable membrane 13 to block the hollow 70. The rear fan 29b is installed in a position between the outside-air outlet 28 and permeable membrane 13 to block the hollow 70.

As shown in FIG. 9(a), the oxygen sensor 18 is embedded in a dashboard of the vehicle 10. The oxygen sensor 18 detects the oxygen concentration in the cabin 19.

As shown in FIG. 9(a), the controller 90 is housed inside the dashboard of the vehicle 10. When the oxygen concentration in the cabin 19 detected by the oxygen sensor 18 is at a predetermined value, the controller 90 outputs a command to introduce outside air to the forward fan 29a and rear fan 29b. The controller 90 includes a CPU (Central Processing Unit), ORM (Object/Relational Mapping), RAM (Random Access Memory), an I/O (Input/Output) and the like.

The oxygen concentration detected by the oxygen sensor 18 is sent to the controller 90. The controller 90 determines whether or not oxygen is at or below a predetermined concentration based on the oxygen concentration sent from the oxygen sensor 18. When the controller 90 determines that oxygen is at or below the predetermined concentration, it outputs a command to introduce outside air to the forward fan 29a and rear fan 29b, allowing outside air to be introduced into the hollow 70. Conversely, when the controller 90 determines that the oxygen concentration exceeds the predetermined concentration, it does not output the command to introduce outside air to the forward fan 29a and rear fan 29b.

The forward fan 29a and rear fan 29b operate upon reception of the command from the controller 90, to introduce more outside air into the hollow 70 than in cases where only the outside-air inlet 26 is provided.

According to the embodiment of FIG. 10(c), outside air is introduced into the hollow 70 only when the oxygen concentration in the cabin 19 is at or below a predetermined value. This minimizes the chances of outside air that contains a certain amount of hydrocarbons and the like coming into contact with the permeable membrane 13. Thus, adsorption or absorption of hydrocarbons and the like onto or into the permeable membrane 13 is unlikely to proceed, thereby retarding degradation of the selective separation performance of the permeable membrane 13. That is, the lifetime of the permeable membrane 13 can be increased.

The oxygen sensor 18 may be replaced with a carbon dioxide sensor, which causes the forward fan 29a and rear fan 29b to operate when the carbon dioxide concentration in the cabin 19 is high, allowing outside air to be introduced into the hollow 70. Moreover, a sensor that detects the concentration or counts the number of fine solid components may be used to introduce outside air into the hollow 70 in response to the concentration of the fine solid components.

The term "predetermined concentration" with respect to oxygen, carbon dioxide, hydrocarbons and the like, which is used as a reference for determining whether or not outside air is introduced, is set to maintain comfort in the cabin 19. The predetermined concentration varies depending on the type of component whose concentration is measured, such as oxygen, carbon dioxide, hydrocarbons or the like.

As shown in FIG. 11(a), multiple holes may be provided in the ceiling portion of the interior wall 24, and the permeable membrane 13 may be installed to cover the holes. At this time, all of the multiple holes are covered with the permeable membrane 13, and reinforcing materials 12a, 12b for reinforcing the periphery of the permeable membrane 13 are tightly attached to the interior wall 24. This prevents the outside air introduced via the outside-air inlet 26 from directly entering the cabin 19.

As shown in FIG. 11(b), a filter 36 for removing coarse dust and the like may be provided on a side of the permeable membrane 13 opposite the cabin. Further, as shown in FIG. 11(c), a meshed reinforcing material 134 may be disposed to block the opening formed in the ceiling portion of the interior wall 24, and the permeable membrane 13 may be disposed on the surface of the reinforcing material 134.

Figure 12:
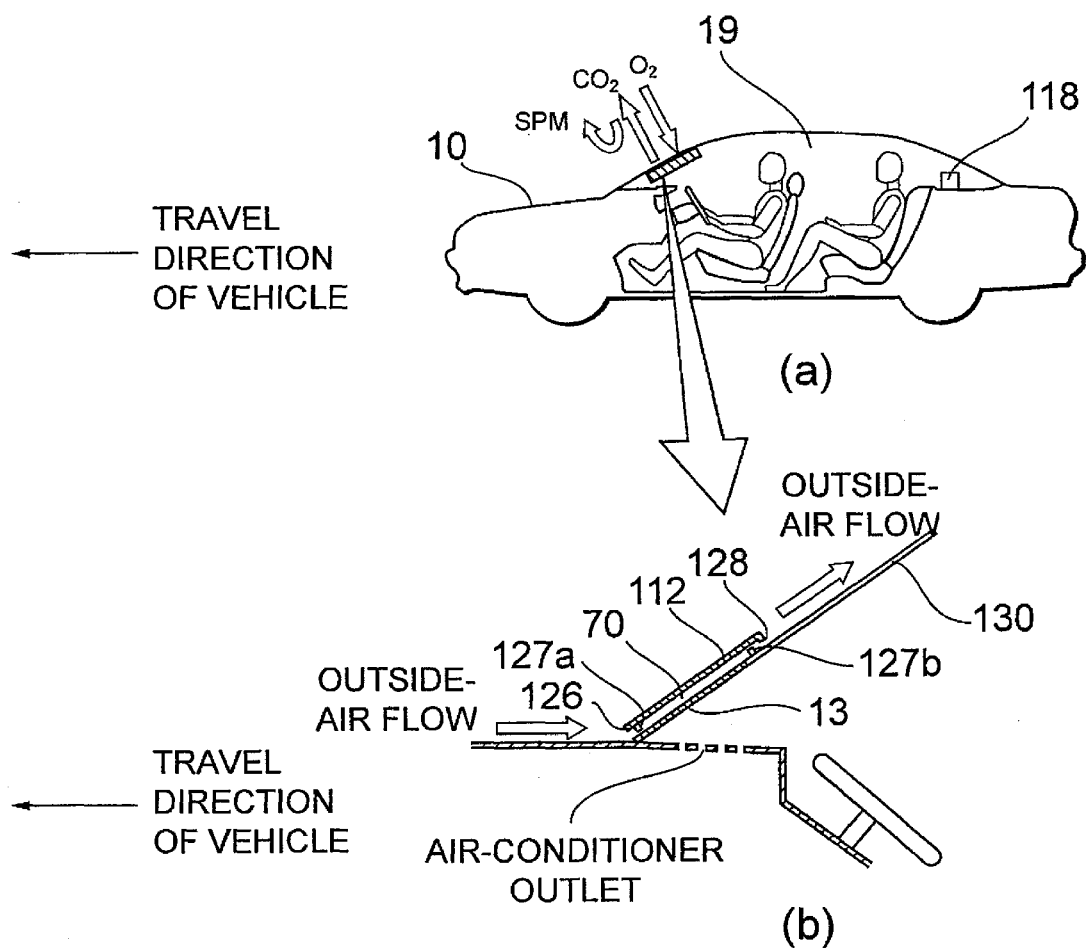
FIG. 12 is a schematic structural diagram showing one embodiment of a vehicle including a windshield portion having a permeable membrane.

FIG. 12 is a schematic structural diagram showing one embodiment of a vehicle including a windshield portion having a permeable membrane. FIG. 12(a) is an overall view of the vehicle, and FIG. 12(b) is an enlarged view of the windshield portion.

The permeable membrane 13 is disposed to block a substantially rectangular opening formed on a lower portion of a windshield 130 of the vehicle 10.

A cover 112 is disposed opposite the permeable membrane 13 on a side of the permeable membrane 13 facing outside the vehicle. A hollow 70 is formed between the cover 112 and permeable membrane 13. The cover 112 is provided to block water drops from the permeable membrane 13. When viewed from the front of the vehicle 10, the cover 112 has a substantially rectangular shape; and when viewed from a side of the vehicle 10, the cover 112 has a shape curved along the windshield 130. The cover 112 is slightly greater in longer and shorter dimensions than those of the permeable membrane 13, thus entirely covering the permeable membrane 13. The dimensions of the permeable membrane 13, i.e., the lengths of the longer and shorter dimensions, are determined based on the type of the vehicle 10 or the amount of the outside air introduced into the hollow 70.

An outside-air inlet 126 for introducing outside air into the hollow 70 is defined by an end of the cover 112 and an end of the permeable membrane 13 facing the travel direction of the vehicle. An outside-air outlet 128 for discharging the outside air introduced into the hollow 70 is defined by an end of the cover 112 facing opposite the travel direction of the vehicle and an end of the windshield 130 facing the travel direction of the vehicle.

Each of the outside-air inlet 126 and outside-air outlet 128 is an elongated hole with a substantially rectangular shape, whose longer dimension faces the width direction of the vehicle 10. The lengths of the longer and shorter dimensions of each of the outside-air inlet 126 and outside-air outlet 128 are determined based on the type of vehicle or the amount of the outside air introduced into the hollow 70.

A forward weir 127a is mounted on a portion of the cover 112 near the outside-air inlet 126. A rear weir 127b is mounted on an outside surface of a portion of the windshield 130 positioned inside the hollow 70.

The forward weir 127a is an elongated plate with a substantially rectangular shape, and is mounted on the cover 112 so that its longer dimension faces the width direction of the vehicle 10. The forward weir 127a is disposed forward of the permeable membrane 13 in the travel direction of the vehicle. The length of the longer dimension of the forward weir 127a is slightly greater than the length of the permeable membrane 13 in the width direction of the vehicle 10, in order to prevent water drops from entering the permeable membrane 13. Water drops potentially contained in the outside air that has been introduced into the hollow 70 are removed by the forward weir 127a, fall down on an outside surface of the body of the vehicle 10, and run along the outside surface of the body to be discharged out of the vehicle 10 via a drain.

The rear weir 127b is composed of the same plate as that of the forward weir 127a. The rear weir 127b also has a length greater than that of the permeable membrane 13 in the width direction of the vehicle 10. The rear weir 127b blocks water drops from entering the hollow 70 via the outside surface of the windshield 130, and the blocked water drops are discharged out of the vehicle 10 via a drain.

Figure 13:
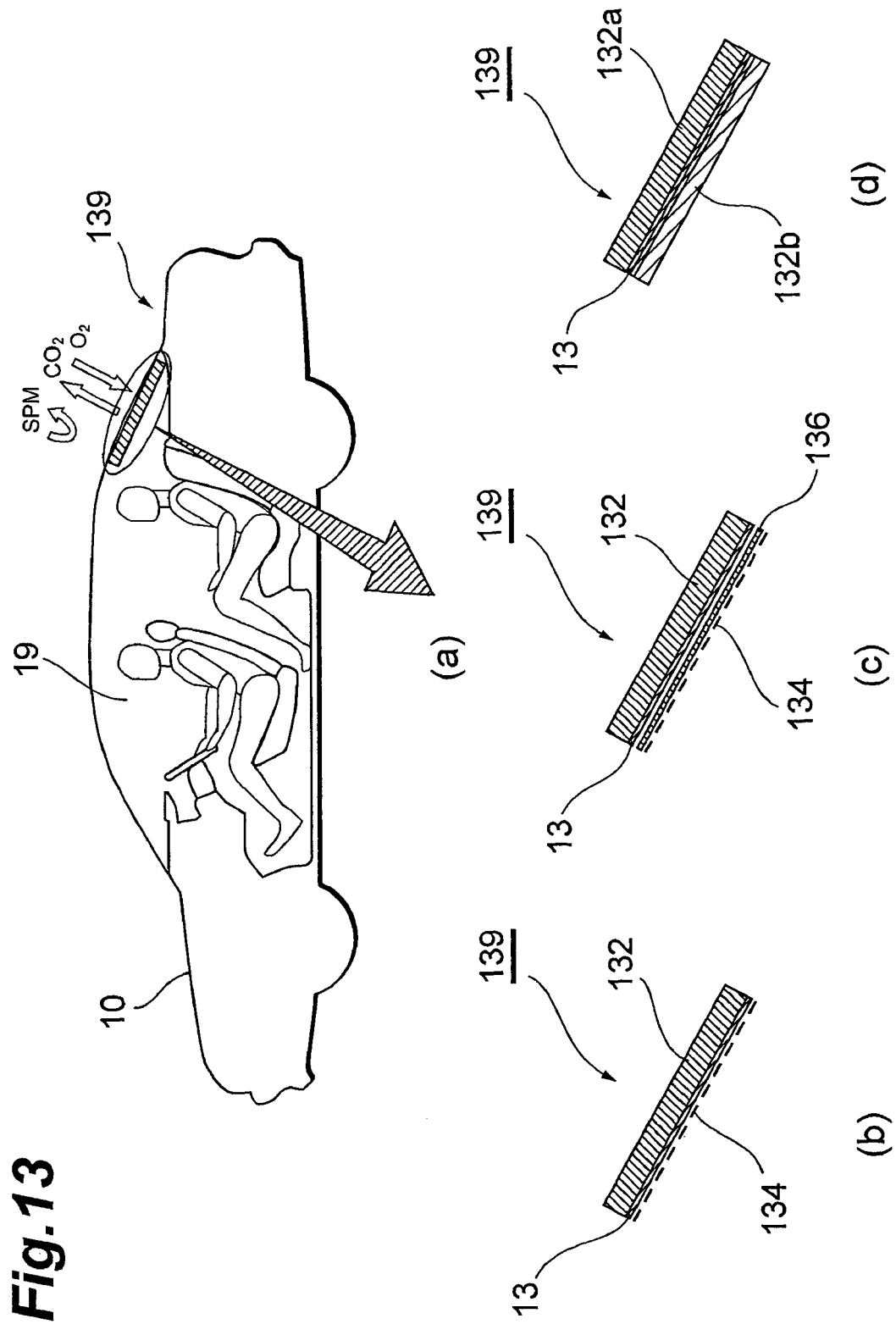
FIG. 13 is a schematic structural diagram showing one embodiment of a vehicle including a rear window having a permeable membrane.

FIG. 13 is a schematic structural diagram showing one embodiment of a vehicle including a rear window having a permeable membrane. FIG. 13(a) is an overall view of a vehicle 10, and FIGS. 13(b), (c), and (d) are each an enlarged view of a rear window.

The rear window 139 shown in FIG. 13(b) includes a plate-like porous glass 132; a permeable membrane 13 laminated on a surface of the porous glass 132 facing a cabin 19; and a meshed reinforcing material 134 laminated on a surface of the permeable membrane 13 facing the cabin 19. The entire porous glass 132 contains pores, and has the function of permeating air in both outside and inside directions of the cabin 19. The permeable membrane 13 is tightly attached to the entire surface of the porous glass 132 facing the cabin 19.

Since the porous glass 132 has the air-permeation function, during running of the vehicle 10, the oxygen and carbon dioxide concentrations in the cabin 19 can be maintained at about equal levels to those in the outside air by air-conditioning via the permeable membrane 13, without introducing outside air into the cabin 19 with a blower or the like. Since there is no need to operate a blower, the load on the in-vehicle battery can be reduced.

As shown in FIG. 13(c), a dust filter 136 may be inserted between the meshed reinforcing material 134 and permeable membrane 13. This prevents dust and the like inside the cabin 19 from attaching to the permeable membrane 13. Further, as shown in FIG. 13(d), the permeable membrane 13 may be sandwiched between a pair of porous glass sheets 132a, 132b disposed opposite each other.

Figure 14:
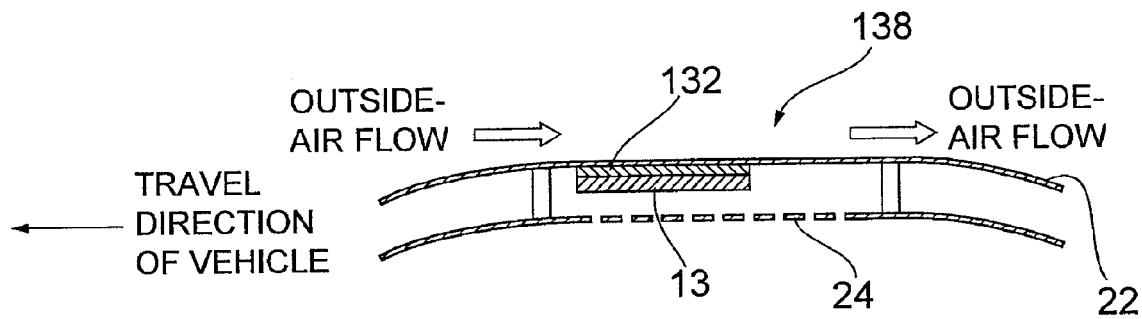
FIG. 14 is a schematic structural diagram showing one embodiment of a vehicle including a sunroof having a permeable membrane.
Figure 14:
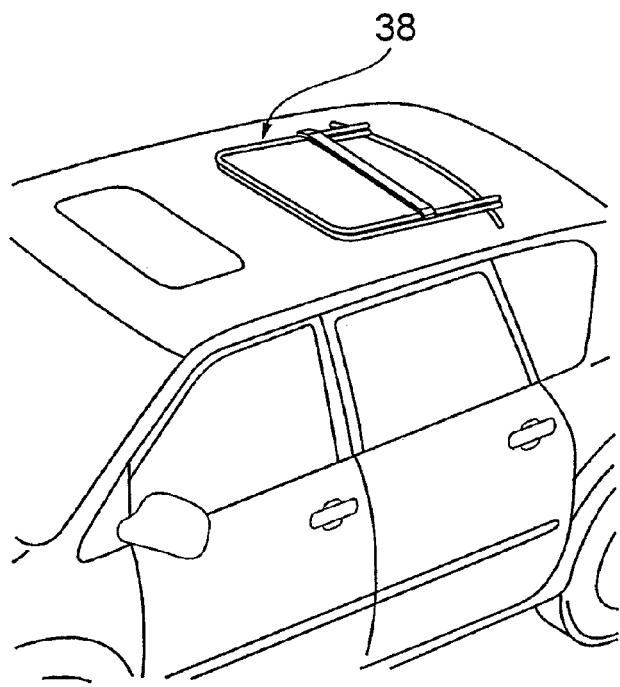

FIG. 14 is a schematic structural diagram showing one embodiment of a vehicle including a sunroof having a permeable membrane. FIG. 14(a) is a diagram showing the sunroof and its vicinity, and FIG. 14(b) is a perspective view showing a portion of the vehicle equipped with the sunroof.

The sunroof 138 shown in FIG. 14 comprises a plate-like porous glass 132; a permeable membrane 13 laminated on a surface of the porous glass 132 facing a cabin; and an interior wall 24 provided with a plurality of holes. Outside air flows along an outside surface of the porous glass 132 from the travel direction of the vehicle toward the opposite direction. At this time, outside air permeates through the porous glass 132 and permeable membrane 13.

Figure 15:
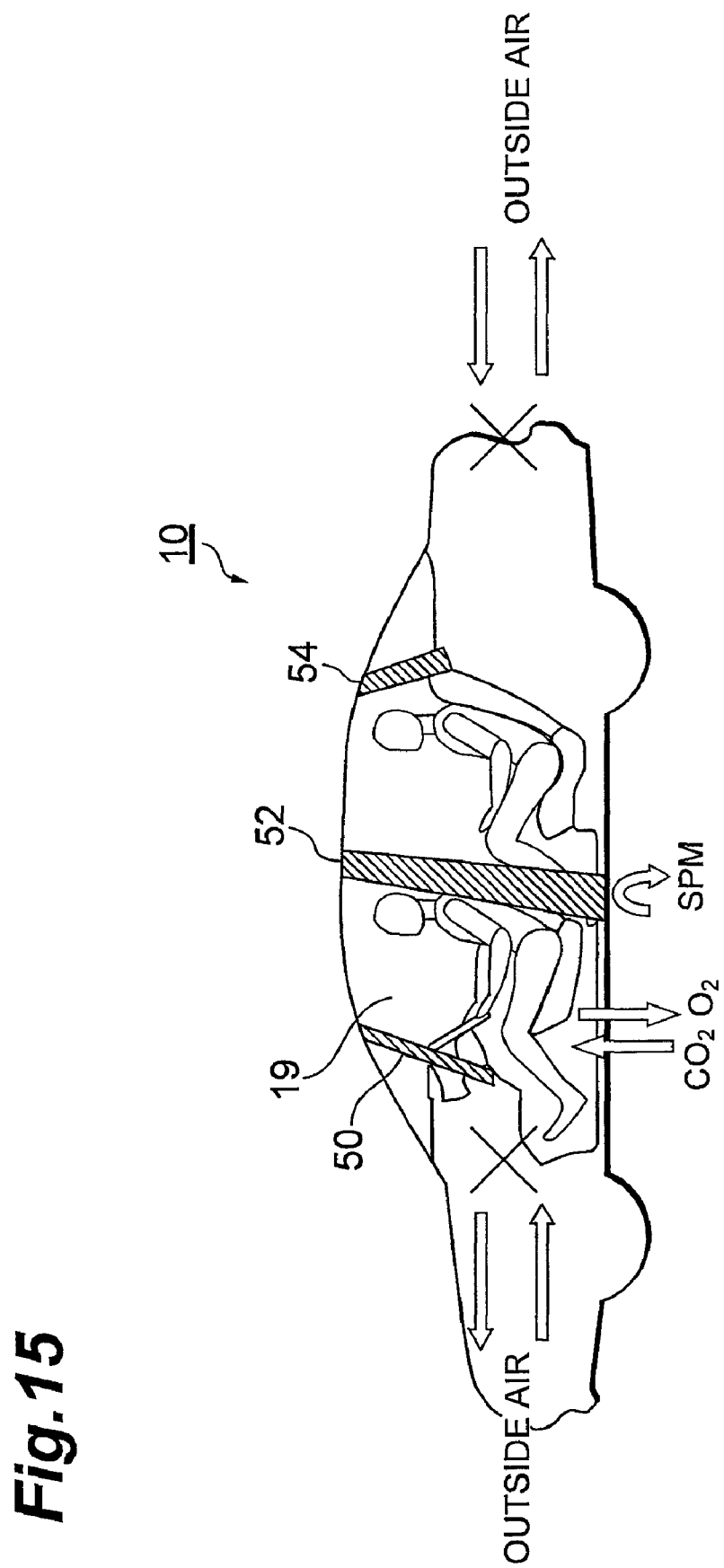
FIG. 15 is a schematic structural diagram showing one embodiment of a vehicle including a pillar having a permeable membrane.

FIG. 15 is a schematic structural diagram showing one embodiment of a vehicle including a pillar having a permeable membrane. In the vehicle 10 shown in FIG. 15, a cabin 19 is formed as a space to be air-conditioned, which is surrounded by cabin walls composed of aluminum, a glass or the like that is substantially air-impermeable. Outside air enters the trunk or engine room outside the cabin 19.

The vehicle 10 has a front pillar 50, a center pillar 52 and a rear pillar 54 as some of the members forming the cabin 19. The front pillar 50 is provided on both sides of the windshield at the front of the cabin 19. The center pillar 52 is provided substantially centrally in the forward-rearward direction of the vehicle 10. The rear pillar 54 is provided on both sides of the rear window at the rear of the cabin 19. At least one of these pillars has a permeable membrane.

The vehicle 10 is equipped with an air-conditioner not shown in the figure. This air-conditioner has only an inside-air circulation mode.

Figure 16:
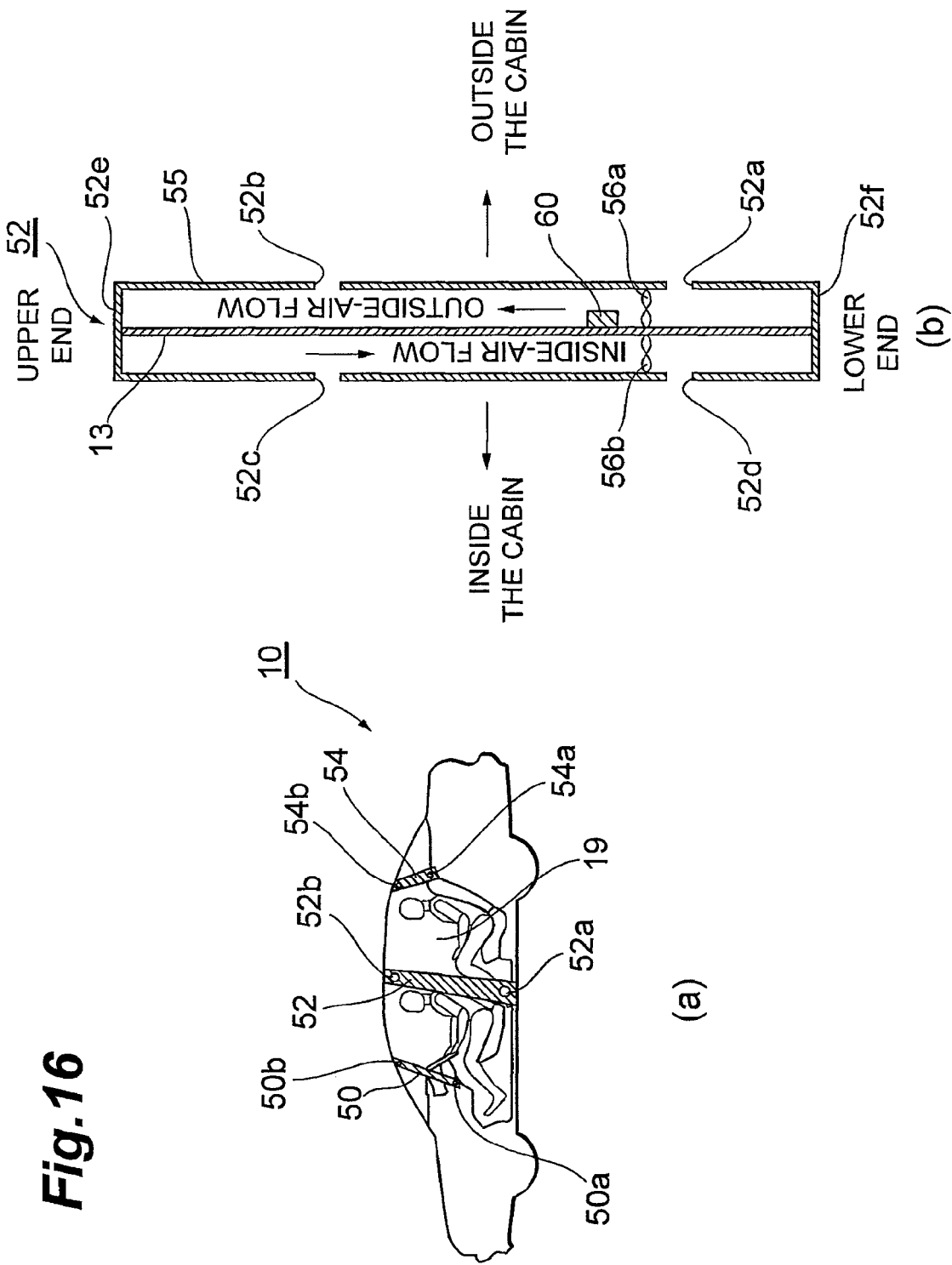
FIG. 16 is a schematic structural diagram showing one embodiment of a vehicle including pillars having a permeable membrane.

FIG. 16 is a schematic structural diagram showing one embodiment of a vehicle including pillars having a permeable membrane. FIG. 16(a) is an overall view of the vehicle with the pillars, and FIG. 16(b) is an enlarged view of a pillar.

As shown in FIG. 16(a), the vehicle 10 has a front pillar 50, a center pillar 52 and a rear pillar 54. Since each of the pillars has substantially the same structure, the center pillar 52 will be described in detail below as an example.

As shown in FIG. 16(b), the center pillar 52 includes a columnar hollow member 55 having an oval upper end 52e and lower end 52f; and a permeable membrane 13 provided inside the hollow member 55. The permeable membrane 13 is disposed along the direction of the major axis of the hollow member 55, so as to divide the space inside the hollow member 55 into two chambers facing outside and inside the cabin. An upper end of the permeable membrane 13 is secured to the upper end 52e of the hollow member 55 with an adhesive, and a lower end of the permeable membrane 13 is secured to the lower end 52f of the hollow member 55 with an adhesive. The permeable membrane 13 need not necessarily have a flat plate shape as shown in FIG. 16(b), and may also have, for example, an accordion shape.

An outside-air inlet 52a and an outside-air outlet 52b are formed on a surface of the hollow member 55 facing outside the cabin. An inside-air inlet 52c and an inside-air outlet 52d are formed on a surface of the hollow member 55 facing inside the cabin. The outside-air inlet 52a is positioned at a lower portion of the hollow member 55, and the outside-air outlet 52b is positioned at an upper portion of the hollow member 55. The inside-air inlet 52c is positioned at an upper portion of the hollow member 55, and the inside-air outlet 52d is positioned at an upper portion of the hollow member 55. Outside air introduced into the inside of the center pillar 52 via the outside-air inlet 52a and discharged via the outside-air outlet 52b, and inside air introduced via the inside-air inlet 52c and discharged via the inside-air outlet 52d, are separated with the permeable membrane 13.

A temperature sensor 60 is provided on a surface of the permeable membrane 13 facing outside the cabin 19. A fan 56a is provided in the chamber of the hollow member 55 facing inside the cabin, and a fan 56b is provided in the chamber of the hollow member 55 facing outside the cabin. The fan 56a is installed along an outside-air intake path extending from the outside-air inlet 52a to the outside-air outlet 52b, and the fan 56b is installed along an inside-air circulating path extending from the inside-air inlet 52c to the inside-air outlet 52d.

The temperature sensor 60 converts the surface temperature of the permeable membrane 13 to an electric signal for output. A thermocouple, a Peltier device or the like can be used as the temperature sensor 60.

The fans 56a, 56b operate when the surface temperature of the permeable membrane 13 measured by the temperature sensor 60 has reached a predetermined temperature. The fans 56a, 56b operate to introduce outside air via the outside-air inlet 52a and inside air via the inside-air inlet 52c, respectively, thereby air-cooling the permeable membrane 13.

Figure 17:
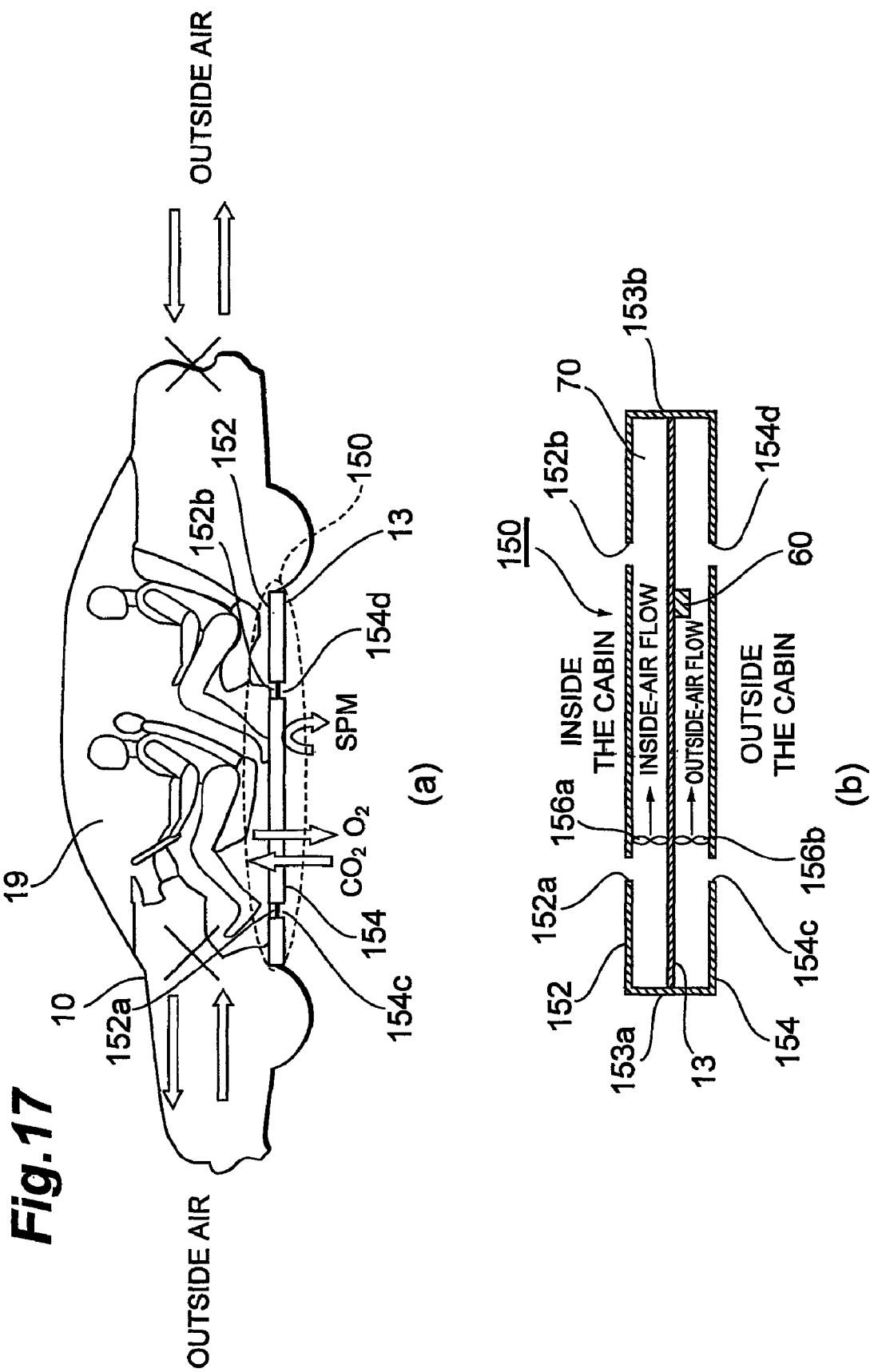
FIG. 17 is a schematic structural diagram showing one embodiment of a vehicle including a floor portion having a permeable membrane.

FIG. 17 is a schematic structural diagram showing one embodiment of a vehicle including a floor portion having a permeable membrane. FIG. 17(a) is an overall view of a vehicle 10, and FIG. 17(*b*) is an enlarged view of the floor portion 150. In the vehicle 10 shown in FIG. 17, a cabin 19 is formed as a space to be air-conditioned, which is surrounded by cabin walls composed of aluminum, a glass, or the like that is substantially air-impermeable. Outside air enters the trunk or engine room outside the cabin 19.

As shown in FIG. 17(*b*), the floor portion 150 has a floor plate 152 facing the cabin 19, and an outer panel 154 positioned opposite the floor plate 152 on a side of the floor plate 152 facing outside the cabin. Side plates 153*a* and 153*b* are mounted on both ends of each of the floor plate 152 and outer panel 154. A hollow 70 is defined by the floor plate 152, outer panel 154, and side plates 153*a*, 153*b*.

The permeable membrane 13 is disposed along the longitudinal direction of the floor portion 150, so as to divide the space inside the hollow 70 into two chambers facing outside and inside the cabin. One end of the permeable membrane 13 is secured to the side plate 153*a* with an adhesive or sealant, and the other end of the permeable membrane 13 is secured to the side plate 153*b* with an adhesive or sealant. The permeable membrane 13 need not necessarily have a flat plate shape as shown in FIG. 17(*b*), and may also have, for example, an accordion shape.

The floor plate 152 is provided with an inside-air inlet 152*a* for introducing inside air into the hollow 70 from inside the cabin 19, and an inside-air outlet 152*b* for discharging into the inside of the cabin 19 the inside air introduced into the hollow 70. The inside-air inlet 152*a* is disposed forward of the driver's seat in the travel direction of the vehicle 10, and more specifically, disposed under the driver's feet. The inside-air outlet 152*b* is disposed rearward of the driver's seat in the travel direction of the vehicle 10, and more specifically, disposed in a position immediately before the backseat.

The outer panel 154 has an outside-air inlet 154*c* for introducing outside air into the hollow 70 from outside the cabin 19, and an outside-air outlet 154*d* for discharging the outside air introduced into the hollow 70 out of the cabin 19. The outside-air inlet 154*c* is disposed forward of the driver's seat in the travel direction of the vehicle 10, and more specifically, disposed under the driver's feet. The outside-air outlet 154*d* is disposed rearward of the driver's seat in the travel direction of the vehicle 10, and more specifically, disposed in a position immediately before the backseat.

A temperature sensor 60 is provided on a surface of the permeable membrane 13 facing outside the cabin 19. In the hollow 70, a fan 156*a* is provided in the chamber facing inside the cabin, and a fan 156*b* is provided in the chamber facing outside the cabin. The fan 156*a* is installed along an inside-air circulating path extending from the inside-air inlet 152*a* to the inside-air outlet 152*b*. The fan 156*b* is installed along an outside-air intake path extending from the outside-air inlet 154*c* to the outside-air outlet 154*d*.

The temperature sensor 60 converts the surface temperature of the permeable membrane 13 to an electric signal for output. A thermocouple, a platinum resistor, a thermistor, or the like can be used as the temperature sensor 60.

The fans 156*a*, 156*b* operate when the surface temperature of the permeable membrane 13 measured by the temperature sensor 60 has reached a predetermined temperature. The fans 156*a*, 156*b* operate to introduce outside air via the outside-air inlet 154*c* and inside air via the inside-air inlet 152*a*, respectively, thereby air-cooling the permeable membrane 13.

The vehicle 10 is equipped with an air-conditioner not shown in the figures. This air-conditioner has only an inside-air circulation mode.

Figure 18:
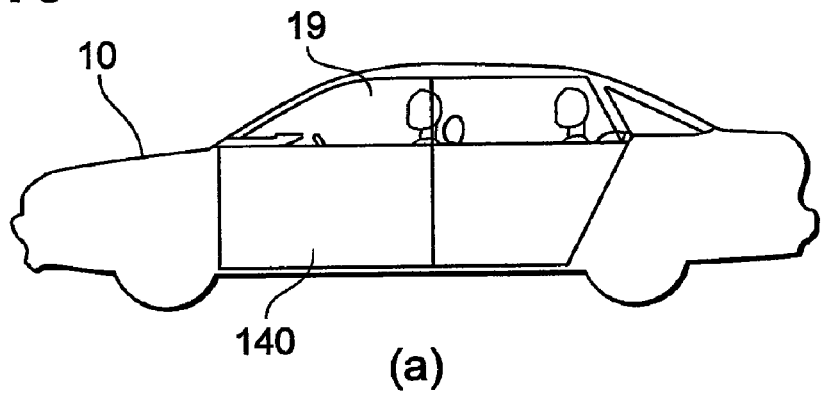
FIG. 18 is a schematic structural diagram showing one embodiment of a vehicle including a door having a permeable membrane.
Figure 18:
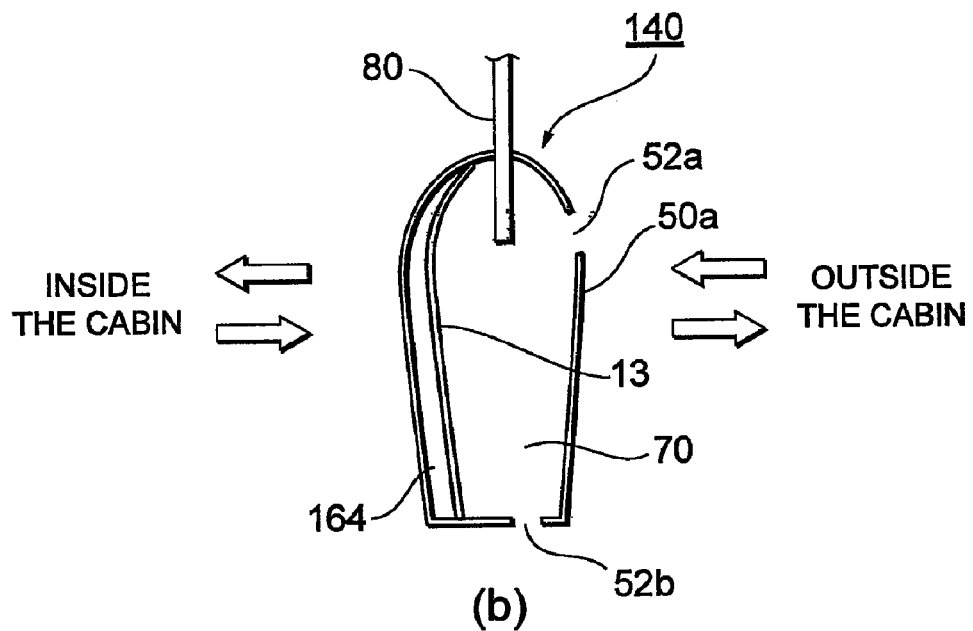
Figure 18:
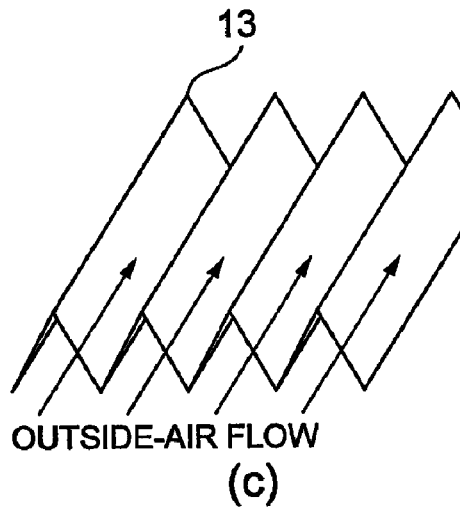
Figure 18:
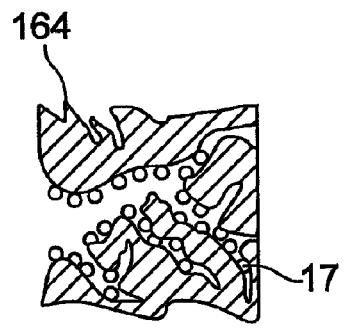

FIGS. 18 to 22 are schematic structural diagrams each showing one embodiment of a vehicle including a door having a permeable membrane. FIGS. 18(*a*), 19(*a*), and 21(*a*) are each an overall view of a vehicle; and FIGS. 18(*b*), 19(*b*), 20, 21(*b*), and 22 are each a schematic cross-sectional view of a door cut along the width direction of the vehicle. FIG. 18(*c*) is a schematic diagram showing the surface of a permeable membrane. FIG. 18(*d*) is an enlarged view of an interior material of the door.

The vehicle 10 shown in FIG. 18(*a*) has a door 140. As shown in FIG. 18(*b*), the door 140 mainly includes an exterior wall 50*a* facing outside a cabin; an interior material 164 facing inside the cabin; a permeable membrane 13 laminated on a surface of the interior material 164 facing outside the cabin; and a windowpane 80 mounted on an upper portion of the exterior wall 50*a* along a substantially central line. The exterior wall 50*a* and interior material 164 define a hollow 70 inside the door 140.

An outside-air inlet 52*a* is formed in a position near the windowpane 80 provided at the upper portion of the exterior wall 50*a*, and an outside-air outlet 52*b* is formed at a lower portion of the exterior wall 50*a*. The outside-air inlet 52*a* is a hole positioned closer to the outside of the cabin than the windowpane 80, in order to introduce outside air from outside the cabin 19. The outside-air outlet 52*b* is a hole positioned closer to the outside of the cabin than the windowpane 80, in order to discharge the outside air introduced via the outside-air inlet 52*a* out of the cabin.

The permeable membrane 13 is disposed to be tightly attached to a side of the interior material 164 facing outside the cabin. The permeable membrane 13 has the function of permeating oxygen and carbon dioxide from a higher-concentration side to a lower-concentration side, while blocking hydrocarbons, nitrogen oxide, sulfur oxide, and SPM. As shown in FIG. 18(*c*), the permeable membrane 13 has an accordion shape in which grooves are formed along the direction of flow of outside air introduced from outside the cabin 19. The accordion shape of the permeable membrane 13 ensures a large surface area. The larger surface area of the permeable membrane 13 allows exchange of a greater amount of oxygen and carbon dioxide. Thus, when the oxygen and carbon dioxide concentrations in the cabin 19 have changed, the concentrations can be returned to certain values in a short period of time.

The interior material 164, which faces the cabin 19, is made of an air-permeable material. The interior material 164 is, for example, a member obtained by forming an inorganic or organic compound into a porous shape, a fibrous shape, a thin-film shape, or a composite shape thereof. The interior material 164 preferably has pores having a pore size of tens to hundreds of nanometers.

FIG. 18(*d*) shows a porous interior material. A deodorizing material 17 is supported on wall surfaces of the pores inside the interior material 164. The deodorizing material 17 is a deodorizer utilizing a heated catalyst, and is an oxide containing at least one metal element selected from the group consisting of copper, manganese, platinum, nickel, iron, tantalum, aluminum and titanium. The pore size of the porous body used as the interior material 164 is not particularly limited as long as it does not prevent the supply of gases to the permselective membrane, but is preferably tens to hundreds of micrometers.

In the door 140, outside air introduced via the outside-air inlet 52*a* comes into contact with a surface of the permeable membrane 13 facing outside the cabin 19, and is subsequently discharged via the outside-air outlet 52*b*. In the meantime, the carbon dioxide concentration in the air inside the cabin 19 increases due to the breathing of the passengers and the like, while the oxygen concentration decreases. When the oxygen concentration in the cabin 19 has become lower than that in the outside air, oxygen is supplied into the cabin 19 from outside the cabin 19 via the permeable membrane 13. When the carbon dioxide concentration has become higher than that in the outside air, carbon dioxide is discharged out of the cabin 19 from inside the cabin 19 via the permeable membrane 13.

During running of the vehicle 10, the amount of outside air introduced via the outside-air inlet 52*a* increases, and therefore, the outside air continuously impinges on the surface of the permeable membrane 13 facing outside the cabin 19. That is, outside air containing certain concentrations of oxygen, carbon dioxide, and SPM is continuously supplied to the surface of the permeable membrane 13 facing outside the cabin 19. Thus, during running of the vehicle 10, the oxygen and carbon dioxide concentrations in the cabin 19 can be maintained at about equal levels to those in the outside air by the permeable membrane 13, without introducing outside air into the cabin 19 with a blower or the like. Moreover, since there is no need to operate a blower, the load on the in-vehicle battery can be reduced.

Furthermore, because the deodorizing material 17 is supported on the interior material 164, it removes any malodorous component contained in the outside air that has permeated through the permeable membrane 13 and reached the side of the permeable membrane 13 facing inside the cabin. Therefore, entry of any malodorous component into the cabin 19 is prevented, allowing the inside of the cabin 19 to be kept comfortable.

Figure 19:
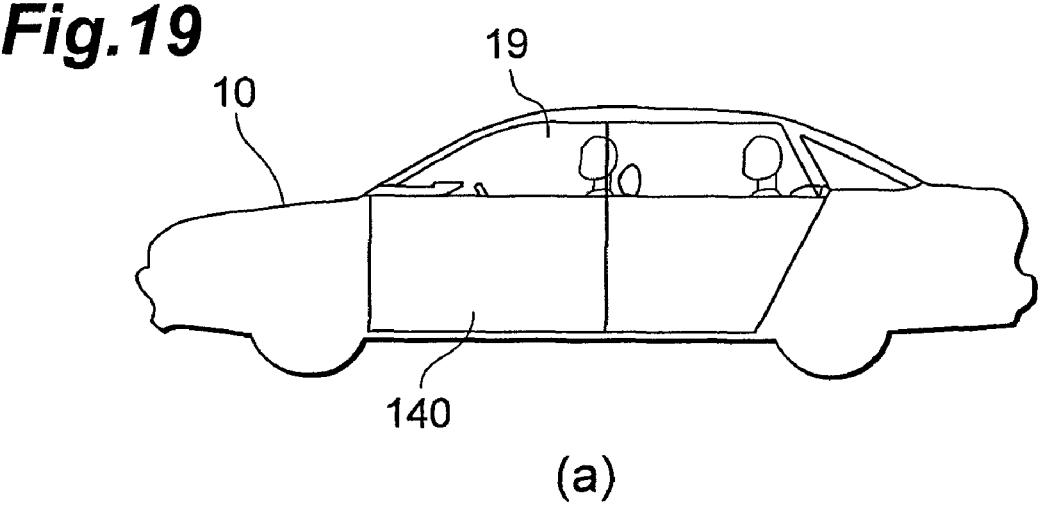
FIG. 19 is a schematic structural diagram showing one embodiment of a vehicle including a door having a permeable membrane.
Figure 19:
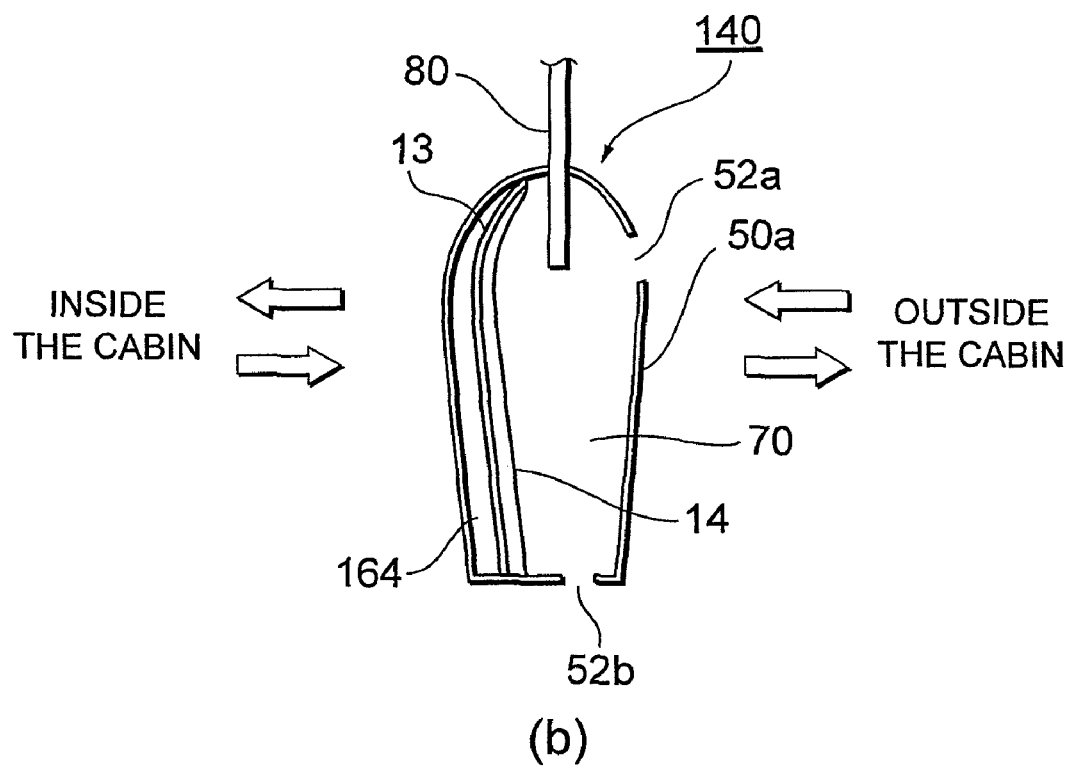

The door 140 according to the embodiment shown in FIG. 19(*b*) has a dust filter 14 tightly attached to a side of the permeable membrane 13 facing outside the cabin. The dust filter 14 is composed of a material having pores larger than the pores in the permeable membrane 13. For example, the dust filter 14 is a nonwoven cloth or knit formed of a fiber such as an activated carbon fiber, a resin fiber or a charged fiber.

Examples of usable resin fibers include polypropylene, nylon, polyester, polyvinyl chloride, polyvinylidene chloride, polyethylene, polyvinylidene fluoride and acrylics. These resin fibers are used alone or in combination.

One example of a charged fiber is an electret fiber obtained by charging a fiber of a polymer such as polypropylene, using an electroelectret method in which ions are forcibly implanted from external electrodes. Examples of usable polymers of such charged fibers include, in addition to polypropylene, Teflon, silicon resins, epoxy resins, polyolefins, polystyrene derivatives, polystyrene, polyamide, polyvinyl halides, polyurethane, polyvinyl chloride and polycarbonates.

Examples of usable methods for charging fibers include, in addition to the electroelectret method, a photoelectret method in which ultraviolet rays or the like are emitted in an electric field; a mechanoelectret method in which a stress is applied to a polymer to cause a plastic flow of the polymer; a thermoelectret method in which a high electric field is applied to a polymer at an elevated temperature; a magnetoelectret method in which a magnetic field is applied at an elevated temperature; and a radioelectret method in which electromagnetic waves such as γ-rays are emitted.

The dust filter 14 provided on the side of the permeable membrane 13 facing outside the cabin removes coarse dust from the outside air that will come into contact with the permeable membrane 13. This prevents dust from attaching to the surface of the permeable membrane 13 facing outside the cabin, thereby inhibiting a reduction in the permeation performance of the permeable membrane 13.

Figure 20:
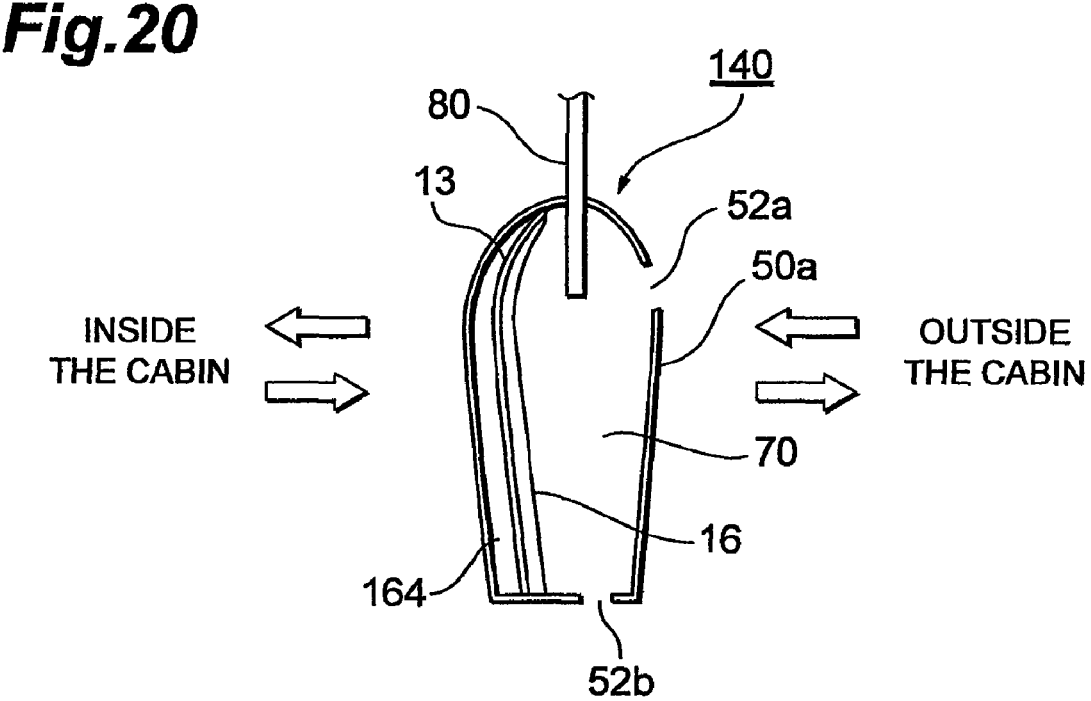
FIG. 20 is a schematic structural diagram showing one embodiment of a vehicle including a door having a permeable membrane.
Figure 20:
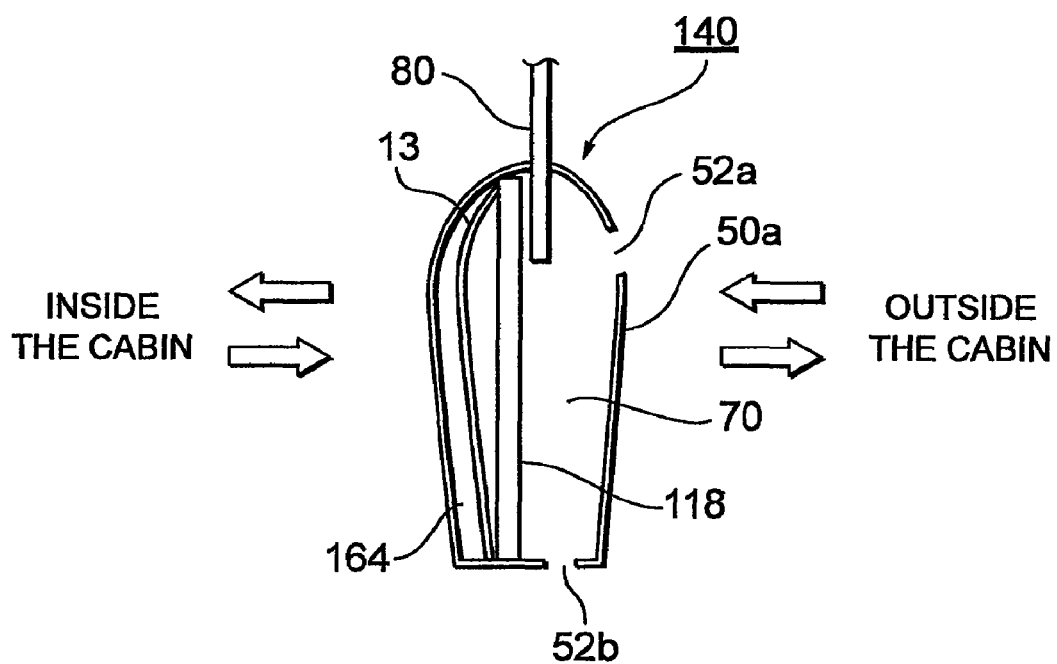

A door 140 according to the embodiment shown in FIG. 20(*a*) has a moisture-proof material 16 tightly attached to a side of the permeable membrane 13 facing outside the cabin. The moisture-proof material 16 removes moisture contained in the outside air that will come into contact with the surface of the permeable membrane 13 facing outside the cabin.

The moisture-proof material 16 is composed of, for example, a mixture of a porous body with a water-absorbing polymer, cotton pulp, water-absorbing paper, a silica gel, calcium oxide, magnesium oxide, or calcium chloride; or a water-absorbing polymer such as an electrolyte polymer or a hydrophilic polymer. Examples of water-absorbing polymers include acrylic polymers, vinyl alcohols and acrylate polymers.

The use of the moisture-proof material 16 enables the removal of moisture contained in the outside air that will come into contact with the surface of the permeable membrane 13 facing outside the cabin, thereby preventing moisture from attaching to the surface of the permeable membrane 13. This inhibits a reduction in the permeation performance of the permeable membrane 13. Moreover, because the entry of moisture into the cabin 19 via the permeable membrane 13 is prevented, fogging of the windowpane 80 can also be prevented. As used herein, the expression "removal of moisture" does not mean that moisture is completely removed, but means that moisture is removed so that the humidity is maintained within an acceptable range.

A door 140 according to the embodiment shown in FIG. 20(*b*) has a blower 118 provided on a side of the permeable membrane 13 facing outside the cabin. The blower 118 supplies outside air introduced via an outside-air inlet 52*a* to a surface of the permeable membrane 13 facing outside the cabin.

In other words, the blower 118 blows outside air from outside the cabin to the permeable membrane 13. This causes fresh outside air having certain concentrations of oxygen and carbon dioxide to continuously impinge on the surface of the permeable membrane 13 facing outside the cabin. Therefore, even if the oxygen and carbon dioxide concentrations in the cabin 19 have changed, the concentrations can be returned to certain values in a short period of time.

Figure 21:
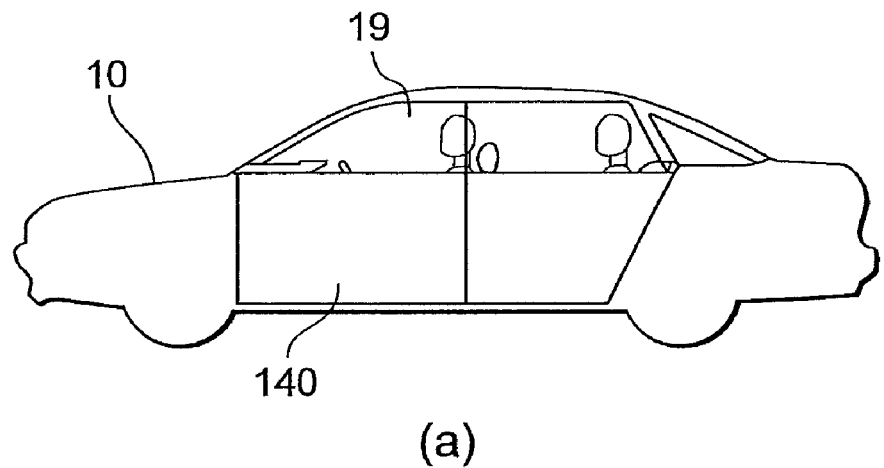
FIG. 21 is a schematic structural diagram showing one embodiment of a vehicle including a door having a permeable membrane.
Figure 21:
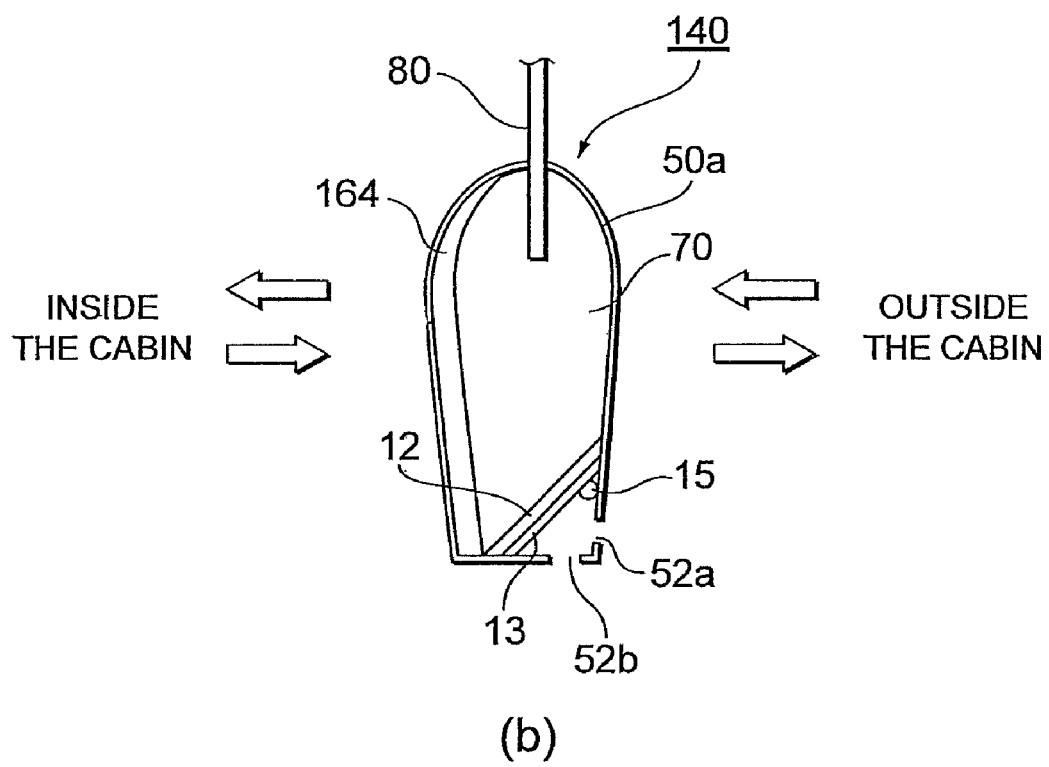
Figure 22:
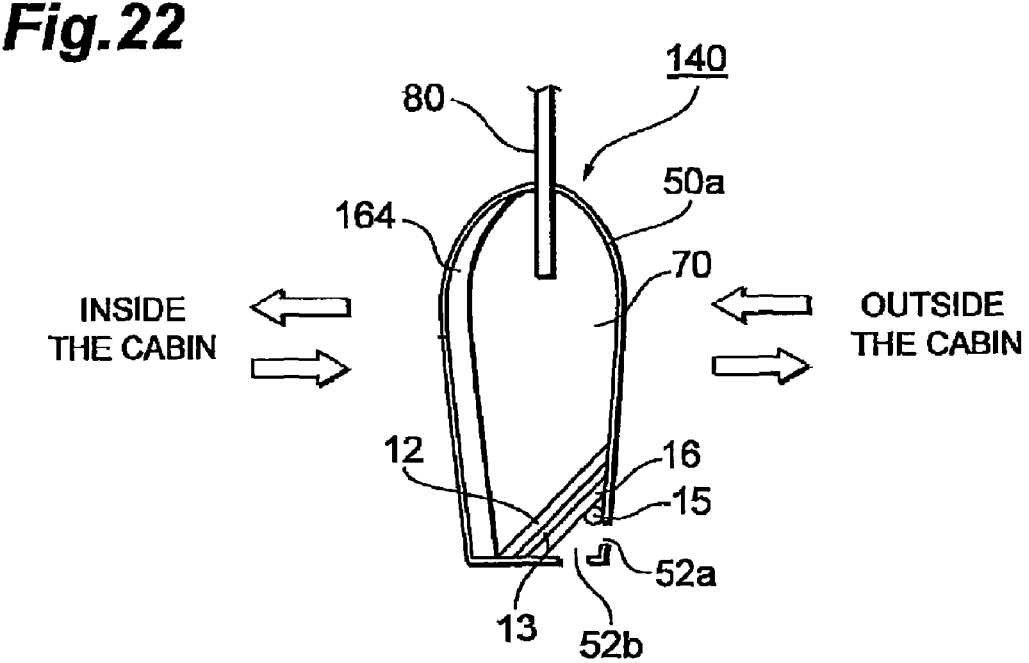
FIG. 22 is a schematic structural diagram showing one embodiment of a vehicle including a door having a permeable membrane.
Figure 22:
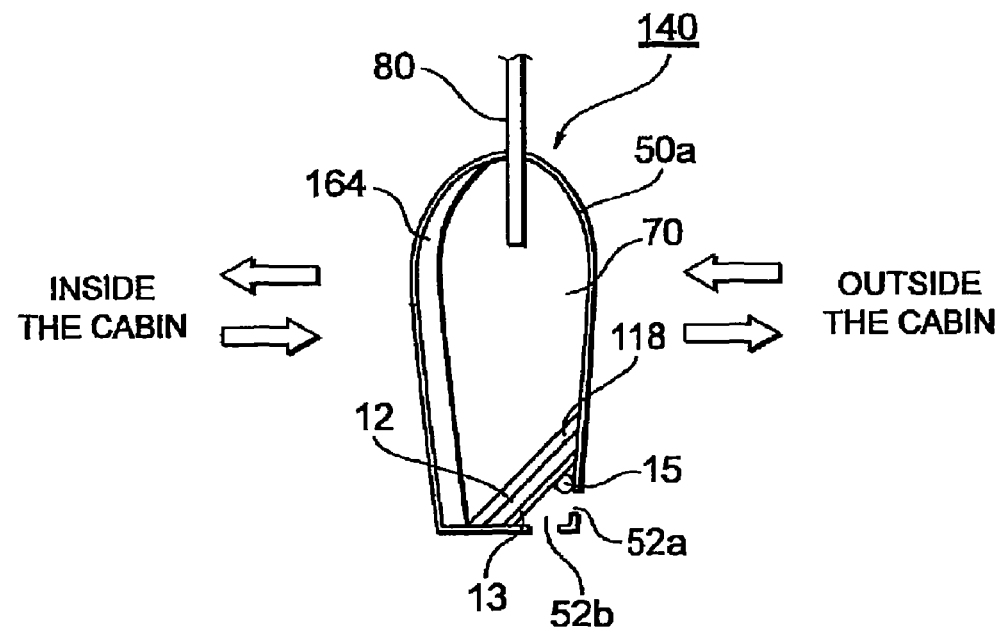

In the case of a door 140 according to the embodiment shown in FIG. 21(*b*), an outside-air inlet 52*a* in an exterior wall 50*a* is provided above an outside-air outlet 52*b* at a lower portion of the exterior wall 50*a*. A laminate having a sheet-like reinforcing material 12 and a permeable membrane laminated on the reinforcing material 12 is disposed obliquely from the upper portion of the outside-air inlet 52*a* to the lower portion of the exterior wall 50*a*, so as to define a chamber in which the outside-air inlet 52*a* and outside-air outlet 52*b* are disposed. The laminate is disposed so that the permeable membrane 13 is positioned to face outside the cabin. The laminate divides a hollow 70 into two chambers. The reinforcement of the permeable membrane 13 with the reinforcing material 12 reduces the possibility of breakage of the permeable membrane 13, even if the permeable membrane 13 is thin.

The reinforcing material 12 preferably has a diameter of tens to hundreds of nanometers. The reinforcing material 12 may have a porous shape, a fibrous shape, a thin-film shape, or a composite shape thereof. The reinforcing material 12 is formed of a material containing an organic polymer, an inorganic compound or carbon.

The reinforcing material 12 is composed of, for example, at least one material selected from polyolefins, polycarbonates, polyethersulfone, polyvinylidene fluoride, polyethylene, fluororesins (for example, PTFE, PEF, etc.), glasses (for example, fibrous glasses) and cellulose. The reinforcing material 12 has a higher order structure similar to that of a porous body.

A heat-storage material 15 is provided on the exterior wall 50a near a side of the permeable membrane 13 facing outside the cabin. The heat-storage material 15 stores externally supplied heat such as the radiant heat of sunlight, and heats the permeable membrane 13 using the stored heat. The heat-storage material 15 is formed of a material having a thermal conductivity higher than those of the permeable membrane 13 and reinforcing material 12. Specifically, the heat-storage material 15 is formed of a honeycomb ceramic material, or a material in which an inorganic salt hydrate, a paraffin, or a wax is supported on a porous body.

The amount of oxygen and carbon dioxide permeated through the permeable membrane 13 increases as the temperature increases. The heat-storage material 15 heats the permeable membrane 13 to increase the temperature, allowing the amount of oxygen and carbon dioxide permeated to increase, thereby increasing the rate at which oxygen and carbon dioxide are exchanged between outside and inside the cabin 19. This inhibits an abrupt change in the oxygen and carbon oxide concentrations in the cabin 19, allowing comfort in the cabin 19 to be maintained.

A door 140 according to the embodiment shown in FIG. 22(a) has a moisture-proof material 16 laminated on a side of a permeable membrane 13 facing outside a cabin. The moisture-proof material 16 enables the removal of moisture contained in the outside air that will come into contact with a surface of the permeable membrane 13 facing outside the cabin, thereby preventing moisture from attaching to the surface of the permeable membrane 13. This inhibits degradation in the permeation performance of the permeable membrane 13.

A door 140 according to the embodiment shown in FIG. 22(b) has a blower 118 laminated on a surface of a reinforcing material 12 facing inside a cabin. The blower 118 supplies outside air introduced via an outside-air inlet 52a to a surface of the permeable membrane 13 facing outside the cabin.

A vehicle including any of the air-conditioning systems described above can prevent suspended matter in the air such as SPM from flowing into the cabin, and can remove any suspended matter such as SPM present in the cabin.

EXAMPLES

The present invention will be described in greater detail below using Examples. However, the invention is not limited to the following Examples.

Synthesis of Silicone-Modified Cycloolefin Polymer

Synthesis Example 1

In a 500 mL three-necked flask fitted with a stirrer, a thermometer and a condenser tube, 20 g (0.51 mmol) of norbornen-2-yltris(trimethylsiloxy)silane and 180 g of toluene were mixed and heated to 40° C. To the mixture was added a solution obtained by dissolving 12 mg (0.015 mmol) of bis(tricyclohexylphosphine)benzylidene ruthenium (IV) dichloride in 4 g of toluene, and the polymerization reaction was carried out at 40° C. After the initiation of the polymerization reaction, the solution viscosity gradually increased; after 20 minutes, the polymerization was stopped by the addition of 1 g of ethyl vinyl ether. The polymerized solution was poured into a large amount of methanol to form an aggregated precipitate; after the precipitate was ground and washed, the washed product was filtered off and dried under reduced pressure at 70° C. for 5 hours, giving a silicone-modified cycloolefin polymer as a white solid. The polymer was obtained in a yield of 19 g, and had a number average molecular weight (Mn) of 550,000. This polymer is referred to as the silicone-modified cycloolefin polymer A.

Synthesis Example 2

A silicone-modified cycloolefin polymer was produced as a white solid according to the same procedure as in Synthesis Example 1, except that the amount of bis(tricyclohexylphosphine)benzylidene ruthenium (IV) dichloride used as the polymerization catalyst was changed from 12 mg to 8 mg (0.010 mmol). The polymer was obtained in a yield of 18.5 g, and had Mn of 810,000. This polymer is referred to as the silicone-modified cycloolefin polymer B.

Synthesis Example 3

A silicone-modified cycloolefin polymer was produced as a white solid according to the same procedure as in Synthesis Example 1, except that the amount of bis(tricyclohexylphosphine)benzylidene ruthenium (IV) dichloride used as the polymerization catalyst was changed from 12 mg to 4 mg (0.0049 mmol). The polymer was obtained in a yield of 18.0 g, and had Mn of 1,400,000. This polymer is referred to as the silicone-modified cycloolefin polymer C.

1. Preparation of Asymmetric Membranes

Example 1

Poly(1-trimethylsilyl-1-propyne) (PTMSP) as a polymeric material and mesoporous silica particles (MPS) as a filler were placed in tetrahydrofuran (THF), thus preparing a mixture for the preparation of an asymmetric membrane. The total concentration of the PTMSP and mesoporous silica particles was 2.5 mass % based on the total mass of the mixture. The mass ratio of the MPS was 100 parts by mass to 100 parts by mass of the PTMSP.

Figure 23:
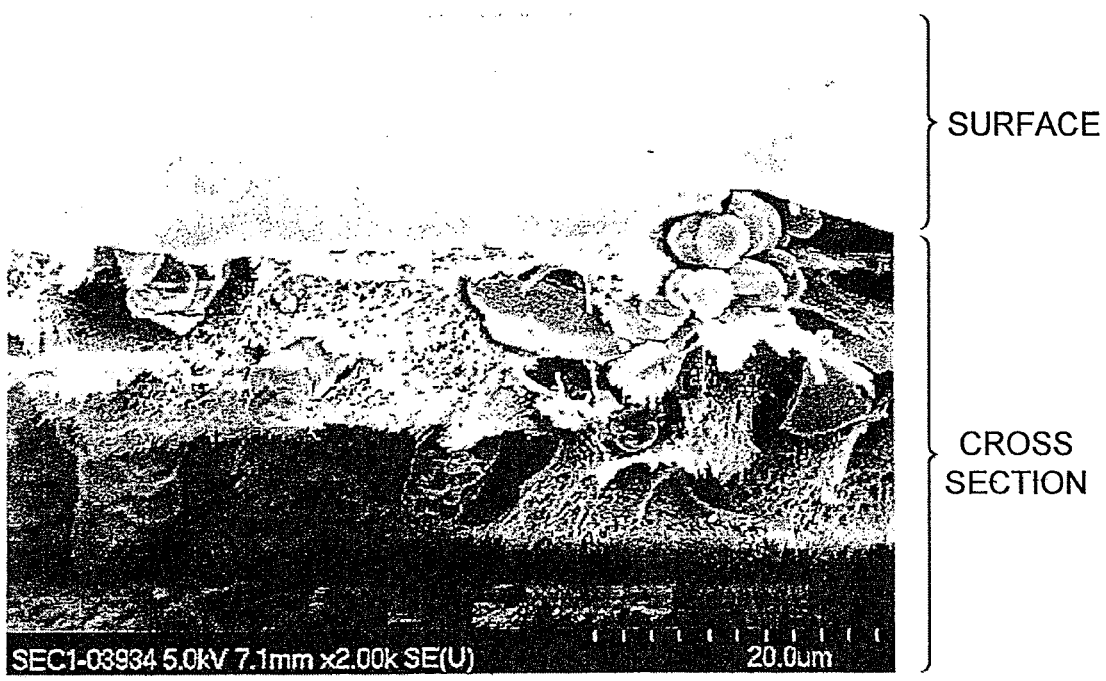
FIG. 23 shows an SEM image of the asymmetric membrane prepared in Example 1.

A 540 μm thick frame was placed on a Teflon plate, and the mixture obtained above was poured into the frame. The mixture was subsequently dried at 25° C. for 2 seconds, thus forming a dense layer on a surface layer portion. The entire material was subsequently immersed in water used as a coagulating solvent, thus forming a porous layer on the side of the Teflon plate. That is, an asymmetric membrane (thickness: 20 μm) having the porous layer and dense layer was formed. FIG. 23 shows an SEM image of a cross section of the obtained asymmetric membrane observed obliquely from above at an angle of 45°. The mesoporous silica particles were dispersed in the porous layer. The thickness of the dense layer was approximately 0.03 μm.

Example 2

An asymmetric membrane was prepared as in Example 1, except that nanoporous silica particles (NPS) were used instead of the MPS.

Example 3

An asymmetric membrane was prepared as in Example 1, except that spherical silica particles, "NanoTek SiO$_2$" (registered trademark, manufactured by C. I. Kasei Co., Ltd., non-porous, particle size (median): 25 nm, surface properties:

hydrophilic), was used instead of the MPS, and the mass ratio of the silica particles was 100 parts by mass to 100 parts by mass of the PTMSP.

Example 4

An asymmetric membrane was prepared as in Example 1, except that spherical silylated silica particles, "X-24-9163A" (manufactured by Shin-Etsu Chemical, Co., Ltd., particle size (median): 110 nm), were used instead of the MPS, and the mass ratio of the silica particles was 100 parts by mass to 100 parts by mass of the PTMSP.

Example 5

An asymmetric membrane was prepared as in Example 1, except that the mass ratio of the MPS was 300 parts by mass to 100 parts by mass of the PTMSP.

Example 6

A mixture for the formation of an asymmetric membrane was prepared as in Example 3, except that the mass ratio of "NanoTek $SiO_2$" was 300 parts by mass to 100 parts by mass of the PTMSP. A 540 μm thick frame was placed on a Teflon plate, and a mesh (material: PET, opening ratio: 45%, opening diameter: 85 μm) was laid inside the frame; the mixture obtained above was then cast to the thickness of the mesh. Otherwise, an asymmetric membrane was prepared as in Example 1.

Example 7

An asymmetric membrane was prepared as in Example 6, except that methanol was used as a coagulating solvent instead of water.

Example 8

An asymmetric membrane was prepared as in Example 6, except that acetone was used as a coagulating solvent instead of water.

Example 9

An asymmetric membrane was prepared as in Example 6, except that "X-24-9163A" was used instead of "NanoTek $SiO_2$", and methanol was used as a coagulating solvent instead of water.

Example 10

An asymmetric membrane was prepared as in Example 6, except that 150 parts by mass of "NanoTek $SiO_2$" and 150 parts by mass of "X-24-9163A" were used instead of 300 parts by mass of "NanoTek $SiO_2$", and methanol was used as a coagulating solvent instead of water.

Example 11

A solution obtained by dissolving the silicone-modified cycloolefin polymer A as a polymeric material in a mixed solvent of THF and methyl alcohol (15 wt % of the THF) and adjusted to a solids content of 3 mass % was blended with 100 parts by mass of "NanoTek $SiO_2$" as a filler, based on 100 parts by mass of the silicone-modified cycloolefin polymer A, thus preparing a mixture for the preparation of an asymmetric membrane.

A mesh for use as an asymmetric membrane substrate (material: PET, opening ratio: 45%, opening length: 85 μm, thickness: 64 μm) was laid over a glass plate, and 100 μm spacer sheets were disposed on both sides of the mesh. The mixture obtained above was cast to the thickness of the mesh, using a bar coater. The mixture was subsequently dried at 25° C. for 3 seconds, thus forming a dense layer on a surface layer portion. The entire material was subsequently immersed in methanol used as a coagulating solvent, thus forming a porous layer on the side of the glass plate. That is, an asymmetric membrane having the porous layer and dense layer on the mesh used as a substrate was formed.

Example 12

An asymmetric membrane was prepared as in Example 11, except that the silicone-modified cycloolefin polymer B was used instead of the silicone-modified cycloolefin polymer A.

Example 13

An asymmetric membrane was prepared as in Example 11, except that the silicone-modified cycloolefin polymer C was used instead of the silicone-modified cycloolefin polymer A.

Example 14

An asymmetric membrane was prepared as in Example 13, except that silica particles obtained by treating "NanoTek $SiO_2$" with polyethylene glycol (PEG) were used instead of "NanoTek $SiO_2$".

Example 15

An asymmetric membrane was prepared as in Example 13, except that the mass ratio of "NanoTek $SiO_2$" was 11 parts by mass to 100 parts by mass of the silicone-modified cycloolefin polymer C.

Example 16

An asymmetric membrane was prepared as in Example 13, except that the mass ratio of "NanoTek $SiO_2$" was 25 parts by mass to 100 parts by mass of the silicone-modified cycloolefin polymer C.

Example 17

An asymmetric membrane was prepared as in Example 13, except that the mass ratio of "NanoTek $SiO_2$" was 72 parts by mass to 100 parts by mass of the silicone-modified cycloolefin polymer C.

Example 18

An asymmetric membrane was prepared as in Example 13, except that the mass ratio of "NanoTek $SiO_2$" was 300 parts by mass to 100 parts by mass of the silicone-modified cycloolefin polymer C.

Example 19

An asymmetric membrane was prepared as in Example 13, except that the mass ratio of "NanoTek SiO$_2$" was 400 parts by mass to 100 parts by mass of the silicone-modified cycloolefin polymer C.

Comparative Examples 1 to 3

Figure 24:
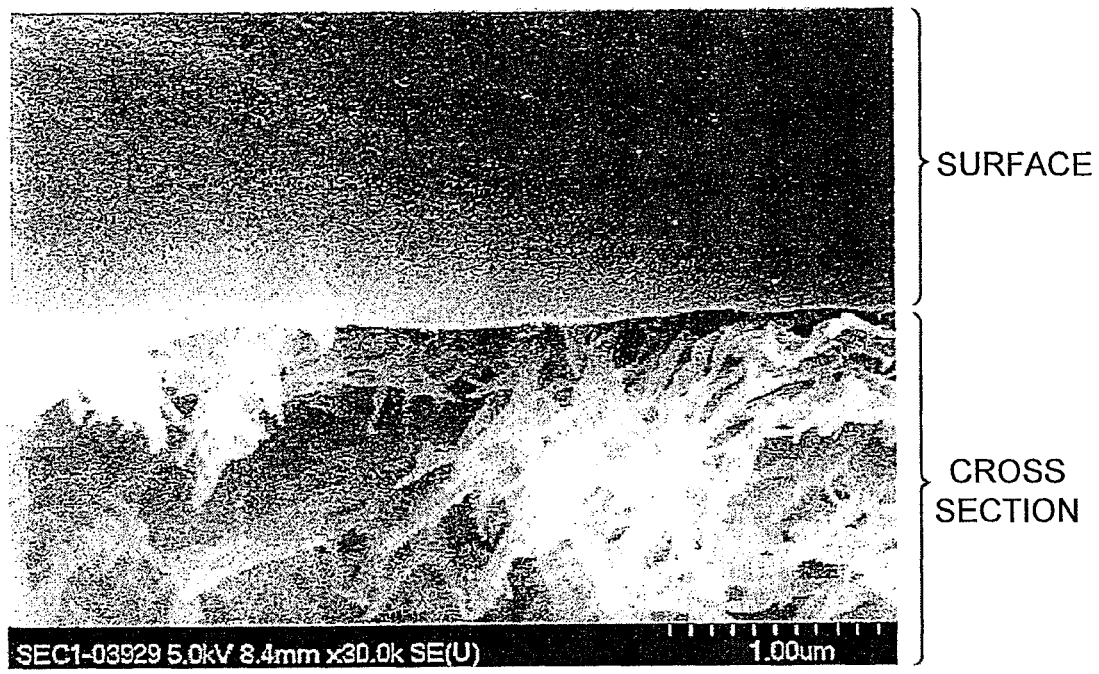
FIG. 24 shows an SEM image of the asymmetric membrane prepared in Comparative Example 3.

Mixtures were prepared as in Example 1, except that the mesoporous silica particles were not used. Asymmetric membranes were formed as in Example 1, except that the drying time for forming a dense layer was 300 seconds in Comparative Example 1, 120 seconds in Comparative Example 2, and 2 seconds in Comparative Example 3. FIG. 24 shows an SEM image of a cross section of the asymmetric membrane obtained in Comparative Example 3 observed obliquely from above at an angle of 45°.

Comparative Example 4

An asymmetric membrane was prepared as in Example 7, except that "NanoTek SiO$_2$" was not used.

Comparative Example 5

Figure 25:
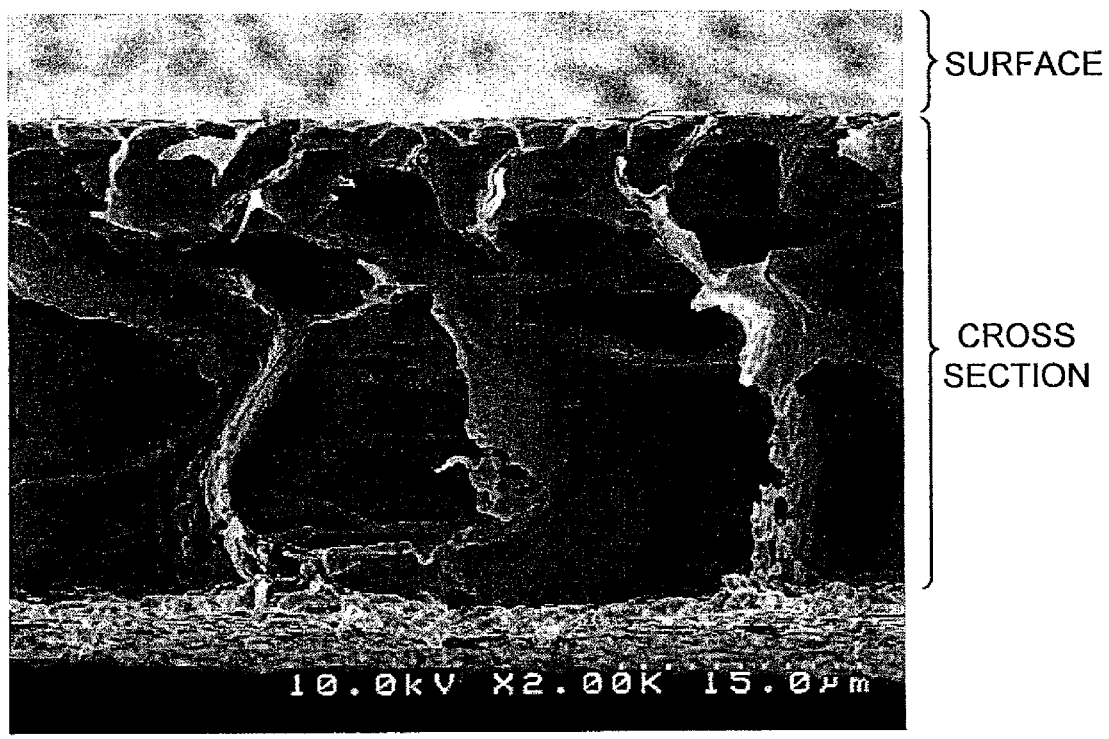
FIG. 25 shows an SEM image of the asymmetric membrane prepared in Comparative Example 5.

An asymmetric membrane was prepared as in Example 13, except that "NanoTek SiO$_2$" was not used. FIG. 25 shows an SEM image of a cross section of the asymmetric membrane obtained in Comparative Example 5 observed obliquely from above at an angle of 45°.

TABLE 1

| | Polymeric Material | Solvent | Drying Time [Sec] | Filler Type | Filler Content [Parts by Mass] | Mesh | Coagulating solvent |
|---|---|---|---|---|---|---|---|
| Comparative Example 1 | PTMSP | THF | 300 | None | — | No | Water |
| Comparative Example 2 | PTMSP | THF | 120 | None | — | No | Water |
| Comparative Example 3 | PTMSP | THF | 2 | None | — | No | Water |
| Comparative Example 4 | PTMSP | THF | 2 | None | — | Yes | Methanol |
| Example 1 | PTMSP | THF | 2 | MPS | 100 | No | Water |
| Example 2 | PTMSP | THF | 2 | NPS | 100 | No | Water |
| Example 3 | PTMSP | THF | 2 | NanoTek SiO$_2$ | 100 | No | Water |
| Example 4 | PTMSP | THF | 2 | X-24-9163A | 100 | No | Water |
| Example 5 | PTMSP | THF | 2 | MPS | 300 | No | Water |
| Example 6 | PTMSP | THF | 2 | NanoTek SiO$_2$ | 300 | Yes | Water |
| Example 7 | PTMSP | THF | 2 | NanoTek SiO$_2$ | 300 | Yes | Methanol |
| Example 8 | PTMSP | THF | 2 | NanoTek SiO$_2$ | 300 | Yes | Acetone |
| Example 9 | PTMSP | THF | 2 | X-24-9163A | 300 | Yes | Methanol |
| Example 10 | PTMSP | THF | 2 | NanoTek SiO$_2$ + X-24-9163A | 150 + 150 | Yes | Methanol |

\* Value based on 100 parts by mass of the polymeric material

TABLE 2

| | Polymeric Material | Solvent | Drying Time [Sec] | Filler Type | Filler Content [Parts by Mass] | Mesh | Coagulating solvent |
|---|---|---|---|---|---|---|---|
| Comparative Example 5 | Silicone-Modified Cycloolefin Polymer C | THF/Methanol | 3 | None | — | Yes | Methanol |
| Example 11 | Silicone-Modified Cycloolefin Polymer A | THF/Methanol | 3 | NanoTek SiO$_2$ | 100 | Yes | Methanol |
| Example 12 | Silicone-Modified Cycloolefin Polymer B | THF/Methanol | 3 | NanoTek SiO$_2$ | 100 | Yes | Methanol |
| Example 13 | Silicone-Modified Cycloolefin Polymer C | THF/Methanol | 3 | NanoTek SiO$_2$ | 100 | Yes | Methanol |
| Example 14 | Silicone-Modified Cycloolefin Polymer C | THF/Methanol | 3 | PEG-Treated NanoTek SiO$_2$ | 100 | Yes | Methanol |
| Example 15 | Silicone-Modified Cycloolefin Polymer C | THF/Methanol | 3 | NanoTek SiO$_2$ | 11 | Yes | Methanol |
| Example 16 | Silicone-Modified Cycloolefin Polymer C | THF/Methanol | 3 | NanoTek SiO$_2$ | 25 | Yes | Methanol |
| Example 17 | Silicone-Modified Cycloolefin Polymer C | THF/Methanol | 3 | NanoTek SiO$_2$ | 72 | Yes | Methanol |
| Example 18 | Silicone-Modified Cycloolefin Polymer C | THF/Methanol | 3 | NanoTek SiO$_2$ | 300 | Yes | Methanol |
| Example 19 | Silicone-Modified Cycloolefin Polymer C | THF/Methanol | 3 | NanoTek SiO$_2$ | 400 | Yes | Methanol |

\* Value based on 100 parts by mass of the polymeric material

2. Evaluation (1) Gas Permeability Coefficient
(Differential Pressure Method)

Each of the asymmetric membranes obtained above was measured for gas permeability coefficients with respect to oxygen and nitrogen ($P(O_2)$ and $P(N_2)$) under the measurement conditions given below, using an apparatus for measuring gas permeability (manufactured by GTR Tec Corporation, model: GTR-20×AMDE). The resulting gas permeability coefficients ($P(O_2)$ and $P(N_2)$) were divided by the thickness of the asymmetric membrane (L) to determine the gas permeation rates ($P(O_2)/L$ and $P(N_2)/L$), respectively. The separation ratio $\alpha$ (=$P(O_2)/P(N_2)$) was also determined. The results are shown in Tables 3 and 4.
Measurement Conditions:
Temperature: 23±2° C.
Pressure downstream of the membrane: approximately 0.0013 atm
Pressure upstream of the membrane: 1.05 to 1.20 atm
Pressure difference through the membrane: 1.05 to 1.20 atm
(Uniform Pressure Method)

Figure 27:
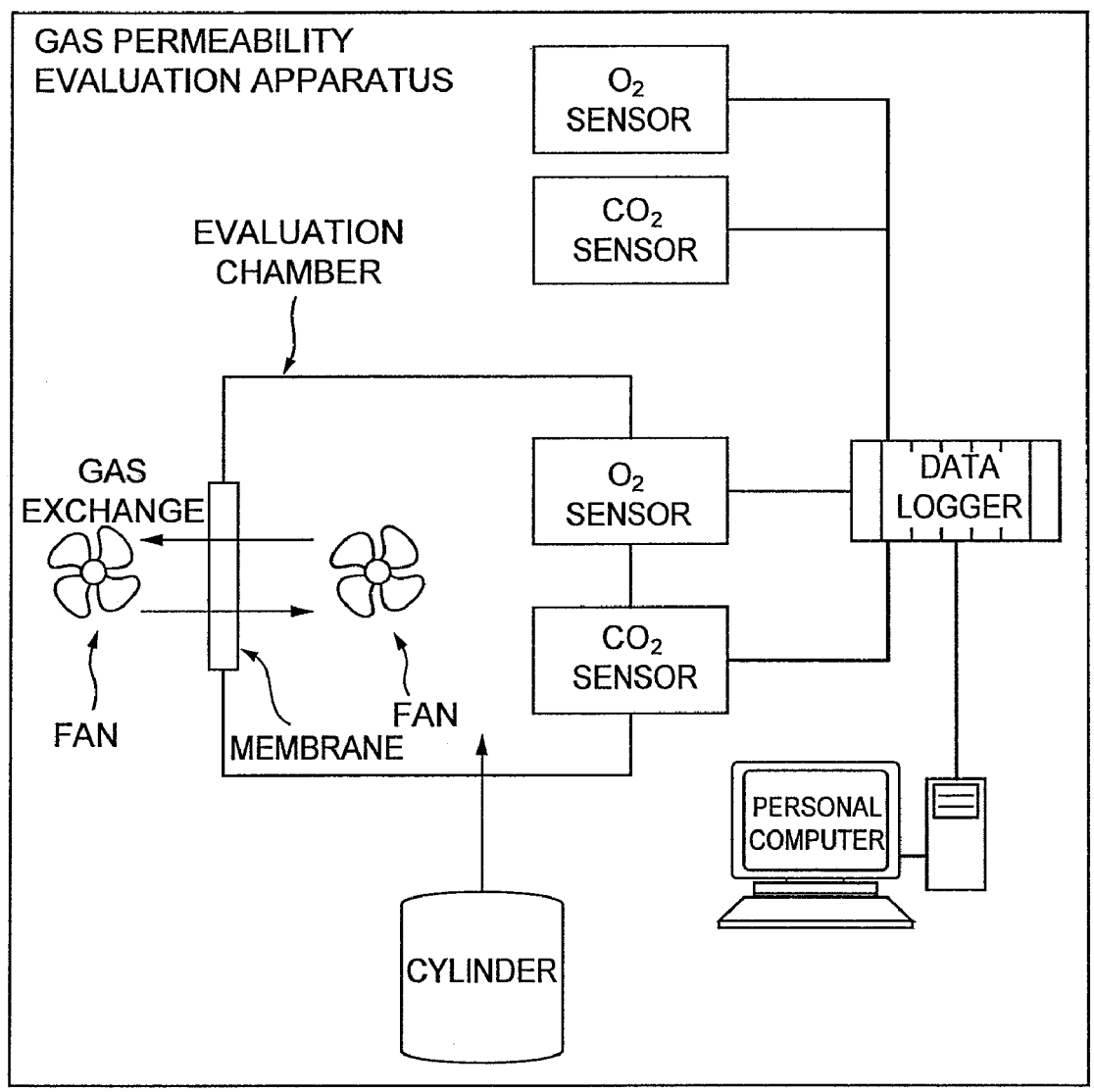
FIG. 27 is a diagram showing an apparatus for measuring gas permeability at uniform pressure.

Each of the asymmetric membranes obtained above was measured for gas permeability coefficients with respect to oxygen and carbon dioxide ($P(O_2)$ and $P(CO_2)$) under the measurement conditions given below, using an apparatus for measuring gas permeability at uniform pressure (manufactured by Denso Corporation, see FIG. 27). The resulting gas permeability coefficients ($P(O_2)$ and $P(CO_2)$) were divided by the thickness of the asymmetric membrane (L) to determine the gas permeation rates ($P(O_2)/L$ and $P(CO_2)/L$), respectively. The separation ratio $\alpha$ (=$P(O_2)/P(CO_2)$) was also determined. The results are shown in Tables 3 and 4.

Figure 26:
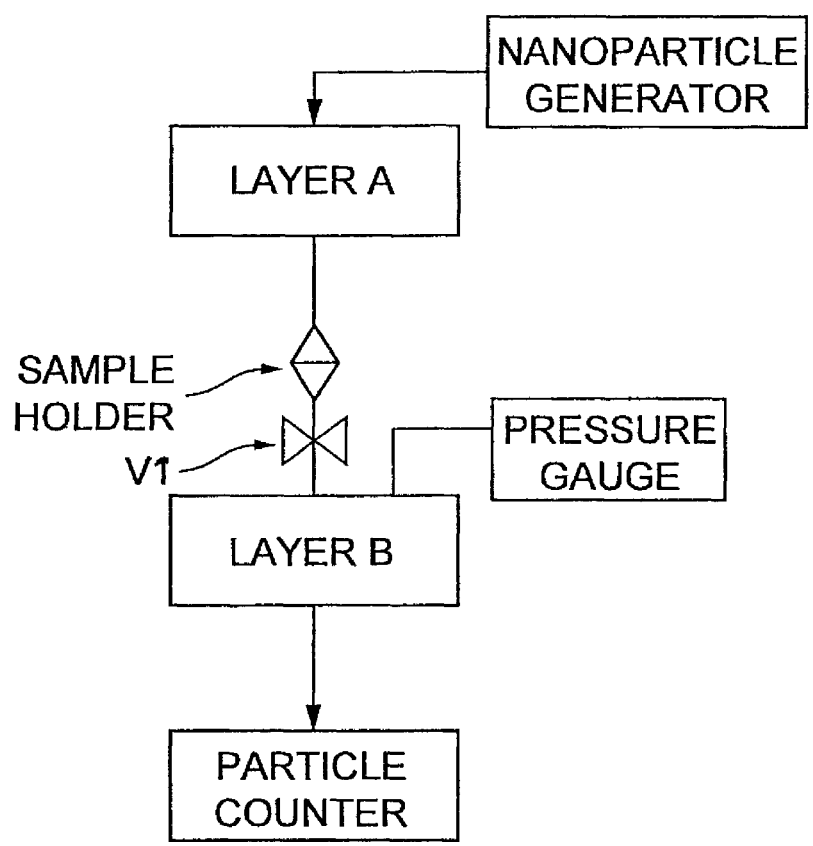
FIG. 26 is a diagram showing an apparatus for measuring the SPM-blocking ratio.

The initial concentration environment for the present evaluation apparatus was created by introducing gases to an evaluation chamber from a cylinder whose oxygen and carbon dioxide concentrations had previously been adjusted (for example, oxygen concentration: 20.5%, carbon dioxide concentration: 4,000 ppm). Outside the evaluation chamber was atmospheric air (oxygen concentration: 20.8 to 20.9%, carbon dioxide concentration: 400 to 600 ppm). A partition plate (not shown) was provided at the portion where the membrane was installed, so as to block the membrane from outside air before the evaluation began. The evaluation of the membrane was initiated under the measurement conditions given below, by removing the partition plate from where the membrane was installed, and an exchange of the gases between outside and inside of the evaluation chamber was performed. Specifically, the gas permeation rates with respect to oxygen and carbon dioxide were measured based on changes in the concentrations of the two gaseous components inside the evaluation chamber. In the initial concentration environment, the direction of the flows of the gases to be measured with respect to the membrane were such that oxygen flowed from outside toward inside, and carbon dioxide flowed from inside toward outside. The oxygen and carbon dioxide concentrations inside and outside the evaluation chamber were measured by an oxygen sensor (manufactured by Chino Corporation, model: MG1200) and a carbon dioxide sensor (manufactured by Vaisala Corporate, model: GMP343), respectively, and the measured results were recorded on a data logger (manufactured by Chino Corporation, model: KIDS verb).
Measurement Conditions:
Temperature: 23±2° C.
Pressure difference through the membrane: zero
Partial pressure differences in the gases through the membrane: oxygen: 0.0013 to 0.0066 atm, carbon dioxide: 0.0001 to 0.0011 atm (3) SPM-Blocking Ratio The SPM-blocking ratio was measured using a measurement apparatus (see FIG. 26) in which a layer A connected with a nanoparticle generator (manufactured by Palas, model: GFG-1000) and a layer B connected with a particle counter (manufactured by TSI Incorporated., model: SMPS-3034) are coupled via a holder in which a membrane sample is placed. The measurement was conducted according to the following procedure:

i) Carbon particles with particle sizes of 10 to 500 nm were generated by the nanoparticle generator and stored in the layer A.

ii) An asymmetric membrane sample was placed in the sample holder (membrane area: a maximum of 16 cm$^2$), and the valve V1 between the sample holder and layer B was closed, causing the pressure in the layer B to decrease until the differential pressure between the layer A and layer B reached 1 kPa.

iii) The valve V1 was opened, and the carbon particles were fed to the membrane together with gases permeated when the pressure in the layer B was returned to atmospheric pressure, and the carbon particles permeated through the membrane were stored in the layer B.

iv) The concentration of carbon particles in the layer B was measured using the particle counter.

v) The SPM-blocking ratio was determined based on the following expression:

$$\text{SPM-blocking ratio[mass \%]} = 100 \times \{(Cin - Cout)/Cin\},$$

wherein Cin is the particle concentration [µg/mL] in the layer A, and Cout is the particle concentration [µg/mL] in the layer B.

TABLE 3

| | Differential Pressure Method | | | Uniform Pressure Method | | | |
|---|---|---|---|---|---|---|---|
| | Gas Permeation Rate [cm$^3$(STP)·sec$^{-1}$·cm$^{-2}$·cmHg$^{-1}$] | | Separation Ratio | Gas Permeation Rate [cm$^3$(STP)·sec$^{-1}$·cm$^{-2}$·cmHg$^{-1}$] | | Separation Ratio | SPM-Blocking |
| | $P(O_2)/L$ | $P(N_2)/L$ | $\alpha$ | $P(O_2)/L$ | $P(CO_2)/L$ | $\alpha$ | Ratio [Mass %] |
| Comparative Example 1 | 2.85 × 10$^{-3}$ | 2.67 × 10$^{-3}$ | 1.07 | — | — | — | 99.9 |
| Comparative Example 2 | 4.49 × 10$^{-3}$ | 4.31 × 10$^{-3}$ | 1.04 | — | — | — | 99.9 |
| Comparative Example 3 | 4.33 × 10$^{-3}$ | 3.61 × 10$^{-3}$ | 1.2 | 4.40 × 10$^{-3}$ | 1.20 × 10$^{-2}$ | 0.37 | 99.9 |
| Comparative Example 4 | — | — | — | 8.12 × 10$^{-3}$ | 1.90 × 10$^{-2}$ | 0.43 | 98.9 |
| Example 1 | 2.40 × 10$^{-2}$ | 2.53 × 10$^{-2}$ | 0.95 | — | — | — | 99.8 |
| Example 2 | 1.22 × 10$^{-2}$ | 1.27 × 10$^{-2}$ | 0.97 | — | — | — | 99.3 |
| Example 3 | 2.75 × 10$^{-2}$ | 2.95 × 10$^{-2}$ | 0.93 | — | — | — | 99.9 |
| Example 4 | 9.23 × 10$^{-3}$ | 9.41 × 10$^{-3}$ | 0.98 | — | — | — | 99.9 |

TABLE 3-continued

| | Differential Pressure Method | | | Uniform Pressure Method | | | |
|---|---|---|---|---|---|---|---|
| | Gas Permeation Rate [$cm^3(STP) \cdot sec^{-1} \cdot cm^{-2} \cdot cmHg^{-1}$] | | Separation Ratio | Gas Permeation Rate [$cm^3(STP) \cdot sec^{-1} \cdot cm^{-2} \cdot cmHg^{-1}$] | | Separation Ratio | SPM-Blocking |
| | $P(O_2)/L$ | $P(N_2)/L$ | α | $P(O_2)/L$ | $P(CO_2)/L$ | α | Ratio [Mass %] |
| Example 5 | $3.96 \times 10^{-2}$ | $4.28 \times 10^{-2}$ | 0.93 | — | — | — | 99.7 |
| Example 6 | $3.40 \times 10^{-2}$ | $3.60 \times 10^{-2}$ | 0.9 | $2.60 \times 10^{-2}$ | $2.20 \times 10^{-2}$ | 1.18 | 99.8 |
| Example 7 | $3.00 \times 10^{-2}$ | $3.40 \times 10^{-2}$ | 0.91 | $1.80 \times 10^{-2}$ | $1.90 \times 10^{-2}$ | 0.95 | 99.9 |
| Example 8 | $3.40 \times 10^{-2}$ | $3.60 \times 10^{-2}$ | 0.9 | $2.20 \times 10^{-2}$ | $2.00 \times 10^{-2}$ | 1.10 | 99.5 |
| Example 9 | — | — | — | $1.73 \times 10^{-2}$ | $1.91 \times 10^{-2}$ | 0.91 | 99.7 |
| Example 10 | — | — | — | $1.65 \times 10^{-2}$ | $1.79 \times 10^{-2}$ | 0.92 | 99.6 |

TABLE 4

| | Differential Pressure Method | | | Uniform Pressure Method | | | |
|---|---|---|---|---|---|---|---|
| | Gas Permeation Rate [$cm^3(STP) \cdot sec^{-1} \cdot cm^{-2} \cdot cmHg^{-1}$] | | Separation Ratio | Gas Permeation Rate [$cm^3(STP) \cdot sec^{-1} \cdot cm^{-2} \cdot cmHg^{-1}$] | | Separation Ratio | SPM-Blocking |
| | $P(O_2)/L$ | $P(N_2)/L$ | α | $P(O_2)/L$ | $P(CO_2)/L$ | α | Ratio [Mass %] |
| Comparative Example 5 | — | — | — | $1.58 \times 10^{-3}$ | $4.77 \times 10^{-3}$ | 0.33 | 99.9 |
| Example 11 | — | — | — | $2.68 \times 10^{-2}$ | $2.39 \times 10^{-2}$ | 1.12 | 94.0 |
| Example 12 | — | — | — | $2.88 \times 10^{-2}$ | $2.10 \times 10^{-2}$ | 1.36 | 99.0 |
| Example 13 | — | — | — | $3.28 \times 10^{-2}$ | $2.71 \times 10^{-2}$ | 1.21 | 98.7 |
| Example 14 | — | — | — | $4.47 \times 10^{-2}$ | $2.72 \times 10^{-2}$ | 1.64 | 99.5 |
| Example 15 | — | — | — | $2.76 \times 10^{-2}$ | $2.48 \times 10^{-2}$ | 1.11 | 99.9 |
| Example 16 | — | — | — | $2.70 \times 10^{-2}$ | $2.52 \times 10^{-2}$ | 1.07 | 99.9 |
| Example 17 | — | — | — | $3.11 \times 10^{-2}$ | $2.52 \times 10^{-2}$ | 1.23 | 99.8 |
| Example 18 | — | — | — | $3.24 \times 10^{-2}$ | $2.64 \times 10^{-2}$ | 1.23 | 99.0 |
| Example 19 | — | — | — | $3.17 \times 10^{-2}$ | $2.52 \times 10^{-2}$ | 1.25 | 98.8 |

As shown in Table 3, the separation ratios α between oxygen and nitrogen of the asymmetric membranes of Examples 1 to 8 were within the range of 0.85 to 1; therefore, Knudsen flow can be considered predominant. The asymmetric membranes of these Examples exhibited gas permeability clearly higher than that of the asymmetric membranes of Comparative Examples 1 to 4 not using a filler. At the same time, these asymmetric membranes were confirmed to be capable of sufficiently blocking SPM.

Furthermore, as shown in Table 4, the separation ratios α of the asymmetric membranes of Examples 11 to 19 were within the range of 1.00 to 1.70, and therefore exhibited gas permeability clearly higher than that of the asymmetric membrane of Comparative Example 5 not using a filler. At the same time, these asymmetric membranes were confirmed to be capable of sufficiently blocking SPM.

INDUSTRIAL APPLICABILITY

According to the present invention, a membrane that can remove suspended matter in the air such as SPM, and has sufficient gas permeability, and an air-conditioning system using the membrane are provided.

The invention claimed is:

1. An asymmetric membrane comprising a porous layer and a dense layer, which contains no pore or pores having a pore volume smaller than that of the porous layer, adjacent thereto, the porous layer and the dense layer being formed of a polymeric material,
wherein the porous layer and/or the dense layer contains a filler, and
wherein the polymeric material is a polymer having at least one Si atom.

2. The asymmetric membrane according to claim 1, wherein the amount of the filler is 11 parts by mass or more per 100 parts by mass of the polymeric material contained in the asymmetric membrane.

3. The asymmetric membrane according to claim 1, wherein the ratio between an oxygen permeability coefficient $P(O_2)$ and a nitrogen permeability coefficient $P(N_2)$ at 23±2° C. under a pressure difference of 1.05 to 1.20 atm through the membrane satisfies Formula (1):

$$0.85 < P(O_2)/P(N_2) < 1 \quad (1).$$

4. The asymmetric membrane according to claim 1, wherein the ratio between the oxygen permeability coefficient $P(O_2)$ and a carbon dioxide permeability coefficient $P(CO_2)$ at 23±2° C. and under no pressure difference through the membrane satisfies Formula (3):

$$0.719 < P(O_2)/P(CO_2) < 1.70 \quad (3).$$

5. The asymmetric membrane according to claim 1, wherein the porous layer and/or the dense layer comprises a mesh.

6. An air-conditioning system comprising the asymmetric membrane according to claim 1 as a membrane that supplies a gas to a space to be air-conditioned and/or discharges the gas from the space to be air-conditioned.

* * * * *